United States Patent
Shih et al.

(10) Patent No.: US 11,477,674 B2
(45) Date of Patent: Oct. 18, 2022

(54) METHOD OF PERFORMING CELL SELECTION OR RESELECTION AND RELATED DEVICE

(71) Applicant: Hannibal IP LLC, Frisco, TX (US)

(72) Inventors: Mei-Ju Shih, Taipei (TW); Hung-Chen Chen, Taipei (TW); Yung-Lan Tseng, Taipei (TW); Chie-Ming Chou, Taipei (TW)

(73) Assignee: Hannibal IP LLC, Frisco, TX (US)

( * ) Notice: Subject to any disclaimer, the term of this patent is extended or adjusted under 35 U.S.C. 154(b) by 0 days.

(21) Appl. No.: 17/025,981

(22) Filed: Sep. 18, 2020

(65) Prior Publication Data

US 2021/0092621 A1 Mar. 25, 2021

Related U.S. Application Data

(60) Provisional application No. 62/902,572, filed on Sep. 19, 2019.

(51) Int. Cl.
 *H04W 24/08* (2009.01)
 *H04W 36/04* (2009.01)
 (Continued)

(52) U.S. Cl.
 CPC ....... *H04W 24/08* (2013.01); *H04W 36/0058* (2018.08); *H04W 36/0061* (2013.01);
 (Continued)

(58) Field of Classification Search
 CPC ................ H04W 24/08; H04W 76/27; H04W 36/0058; H04W 36/0061; H04W 36/04;
 (Continued)

(56) References Cited

U.S. PATENT DOCUMENTS

| | | | |
|---|---|---|---|
| 9,294,970 B1 * | 3/2016 | Sitaram | H04W 36/00835 |
| 2009/0168727 A1 * | 7/2009 | Somasundaram | H04W 36/0072 370/332 |

(Continued)

FOREIGN PATENT DOCUMENTS

| | | | | |
|---|---|---|---|---|
| CN | 101547406 A | * | 9/2009 | |
| WO | WO-2009132587 A1 | * | 11/2009 | ............ H04W 12/08 |

OTHER PUBLICATIONS

3GPP, Technical Specification Group Radio Access Network; NR; Radio Resource Control (RRC) protocol specification (Release 15) 3GPP TS 38.331 V15.4.0 (Dec. 2018), 5G, 474 pages. (Year: 2018).*

(Continued)

*Primary Examiner* — Dung Hong
(74) *Attorney, Agent, or Firm* — Marcella M. Bodner; Cole Schotz, P.C.

(57) ABSTRACT

A method of performing cell selection or reselection by a user equipment (UE) in a radio resource control (RRC) idle mode or an RRC inactive mode is disclosed. The method comprises determining whether a white list is received from a serving cell, wherein the white list includes at least one cell identity, each of the at least one cell identity identifying a cell on at least one of an intra-frequency and an inter-frequency corresponding to a frequency that the serving cell is on, in response to the UE determining that the white list is received from the serving cell, performing a measurement on at least one cell associated with the at least one cell identity according to the white list, and selecting or reselecting a cell according to the measurement, the cell indicated only by the at least one cell identity in the white list.

12 Claims, 2 Drawing Sheets

(51) Int. Cl.
*H04W 72/08* (2009.01)
*H04W 36/00* (2009.01)
*H04W 76/27* (2018.01)
*H04W 84/04* (2009.01)

(52) U.S. Cl.
CPC ......... *H04W 36/04* (2013.01); *H04W 72/085* (2013.01); *H04W 76/27* (2018.02); *H04W 84/042* (2013.01)

(58) Field of Classification Search
CPC ............. H04W 72/085; H04W 84/042; H04W 84/045; H04W 48/16; H04W 48/20; H04W 36/08; H04W 16/32
See application file for complete search history.

(56) References Cited

U.S. PATENT DOCUMENTS

| | | | | |
|---|---|---|---|---|
| 2011/0092214 A1* | 4/2011 | Iwamura | ............... | H04W 24/10 455/438 |
| 2013/0064226 A1* | 3/2013 | Dinan | ................... | H04W 36/30 370/332 |
| 2014/0370901 A1* | 12/2014 | Jung | ............... | H04W 36/00835 455/437 |
| 2015/0131613 A1* | 5/2015 | Jung | .................... | H04W 24/10 370/331 |

OTHER PUBLICATIONS

"5G NR Cell Search and System Acquisition Procedure", Published Jul. 28, 2019 (Year: 2019).*

* cited by examiner

METHOD OF PERFORMING CELL SELECTION OR RESELECTION AND RELATED DEVICE

CROSS-REFERENCE TO RELATED APPLICATION(S)

The present disclosure claims the benefit of and priority to U.S. provisional Patent Application Ser. No. 62/902,572 filed on Sep. 19, 2019, entitled "Method and Apparatus for Cell (Re)selection using White List," (hereinafter referred to as "the '572 provisional"). The disclosure of the '572 provisional is hereby incorporated fully by reference into the present disclosure.

FIELD

The present disclosure generally relates to wireless communications, and more particularly, to a method of performing cell selection or reselection and a related device.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure provides a method of performing cell selection or reselection and a related device.

According to an aspect of the present disclosure, a method of performing cell selection or reselection by a user equipment (UE) in a radio resource control (RRC) idle mode or an RRC inactive mode is disclosed. The method comprises determining whether a white list is received from a serving cell, wherein the white list includes at least one cell identity, each of the at least one cell identity identifying a cell on at least one of an intra-frequency and an inter-frequency corresponding to a frequency that the serving cell is on, in response to the UE determining that the white list is received from the serving cell, performing a measurement on at least one cell associated with the at least one cell identity according to the white list, and selecting or reselecting a cell according to the measurement, the cell indicated only by the at least one cell identity in the white list.

According to another aspect of the present disclosure, a UE for performing cell selection or reselection in an RRC idle mode or an RRC inactive mode is provided. The UE comprises a processor, for executing computer-executable instructions, and a non-transitory computer-readable medium, coupled to the processor, for storing the computer-executable instructions, wherein the computer-executable instructions instruct the processor to perform the method.

BRIEF DESCRIPTION OF THE DRAWINGS

Aspects of the exemplary disclosure are best understood from the following detailed description when read with the accompanying figures. Various features are not drawn to scale. Dimensions of various features may be arbitrarily increased or reduced for clarity of discussion.

DESCRIPTION

Figure 1:
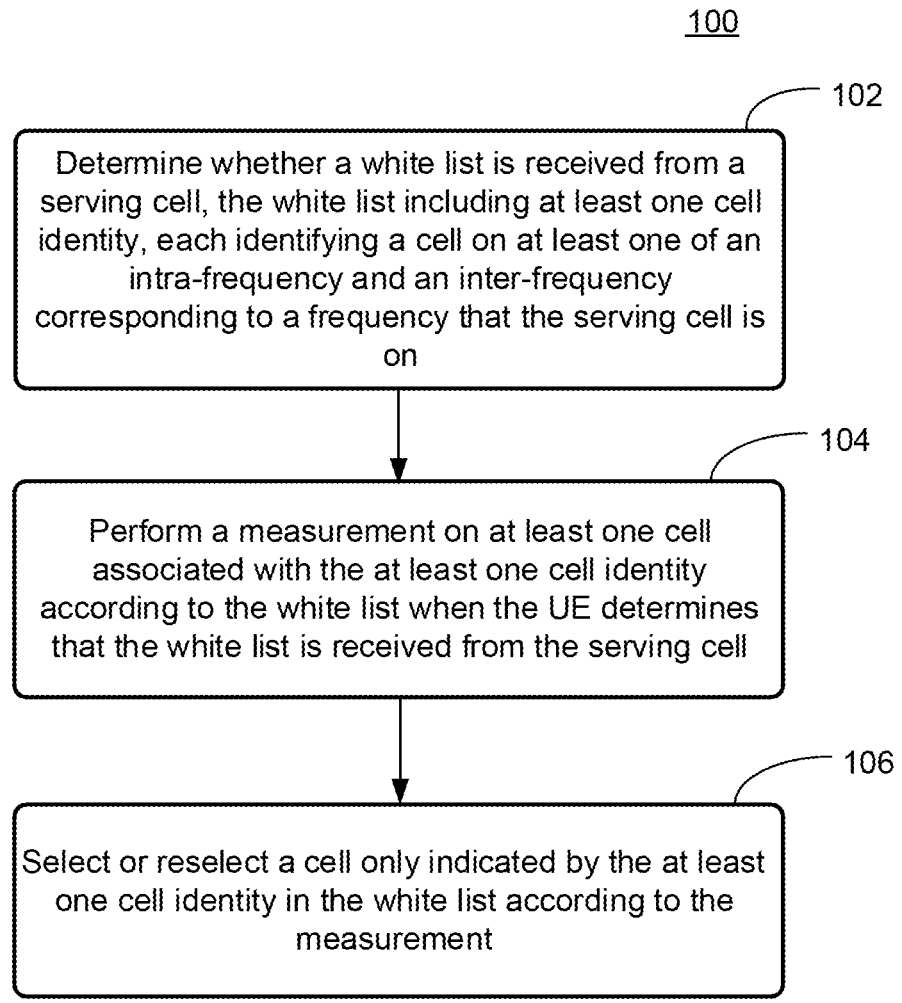
FIG. 1 is a flowchart illustrating a method for cell selection or reselection, according to an implementation of the present disclosure.

The following description contains specific information pertaining to exemplary implementations in the present disclosure. The drawings and their accompanying detailed description are directed to exemplary implementations. However, the present disclosure is not limited to these exemplary implementations. Other variations and implementations of the present disclosure will occur to those skilled in the art. Unless noted otherwise, like or corresponding elements in the figures may be indicated by like or corresponding reference numerals. Moreover, the drawings and illustrations are generally not to scale and are not intended to correspond to actual relative dimensions.

For consistency and ease of understanding, like features are identified (although, in some examples, not shown) by numerals in the exemplary figures. However, the features in different implementations may be different in other respects, and therefore shall not be narrowly confined to what is shown in the figures.

The phrases "in one implementation," and "in some implementations," may each refer to one or more of the same or different implementations. The term "coupled" is defined as connected, whether directly or indirectly via intervening components, and is not necessarily limited to physical connections. The term "comprising" may mean "including, but not necessarily limited to" and specifically indicate open-ended inclusion or membership in the disclosed combination, group, series, and equivalents.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. Besides, the character "/" used herein generally represents that the former and latter associated objects are in an "or" relationship.

Additionally, any two or more of the following paragraphs, (sub)-bullets, points, actions, behaviors, terms, alternatives, examples, or claims in the present disclosure may be combined logically, reasonably, and properly to form a specific method. Any sentence, paragraph, (sub)-bullet, point, action, behaviors, terms, or claims in the present disclosure may be implemented independently and separately to form a specific method. Dependency, e.g., "based on", "more specifically", "preferably", "In one embodiment", "In one implementation", "In one alternative", in the present disclosure may refer to just one possible example that would not restrict the specific method.

For a non-limiting explanation, specific details, such as functional entities, techniques, protocols, standards, and the like, are set forth for providing an understanding of the disclosed technology. In other examples, detailed disclosure of well-known methods, technologies, systems, and architectures are omitted so as not to obscure the present disclosure with unnecessary details.

Persons skilled in the art will recognize that any disclosed network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Applications Specific Integrated Circuitry (ASIC), programmable logic arrays, and/or using one or more Digital Signal Processors (DSPs). Although some of the disclosed implementations are directed to software installed and executing on computer hardware, nevertheless, alternative implementations as firmware or as hardware or combination of hardware and software are well within the scope of the present disclosure.

The computer-readable medium may include but may not be limited to Random Access Memory (RAM), Read-Only Memory (ROM), Erasable Programmable Read-Only Memory (EPROM), Electrically Erasable Programmable Read-Only Memory (EEPROM), flash memory, Compact Disc (CD) Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or an NR system) may typically include at least one base station (BS), at least one UE, and one or more optional network elements that provide connection with a network. The UE may communicate with the network (e.g., a Core Network (CN), an Evolved Packet Core (EPC) network, an Evolved Universal Terrestrial Radio Access Network (E-UTRAN), a Next-Generation Core (NGC), a 5G Core (5GC), or an internet) via a Radio Access Network (RAN) established by one or more BSs.

It should be noted that, in the present disclosure, a UE may include, but is not limited to, a mobile station, a mobile terminal or device, a user communication radio terminal. For example, a UE may be a portable radio equipment, that includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) RAN (GERAN), a next-generation eNB (ng-eNB) as in an Evolved Universal Terrestrial Radio Access (E-UTRA) BS in connection with the 5GC, a next-generation Node B (gNB) as in the 5G-RAN (or in the 5G Access Network (5G-AN)), and any other apparatus capable of controlling radio communication and managing radio resources within a cell. The BS may connect to serve the one or more UEs via a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GRPS), UMTS (often referred to as 3G) according to basic Wideband-Code Division Multiple Access (W-CDMA), High-Speed Packet Access (HSPA), LTE, LTE-A, enhanced LTE (eLTE), NR) (often referred to as 5G), and/or LTE-A Pro. However, the scope of the present disclosure should not be limited to these protocols.

The BS may be operable to provide radio coverage to a specific geographical area using a plurality of cells forming the RAN. The BS may support the operations of the cells. Each cell may be operable to provide services to at least one UE within its radio coverage. More specifically, each cell (often referred to as a serving cell) may provide services to serve one or more UEs within its radio coverage, (e.g., each cell schedules the DL and optionally UL resources to at least one UE within its radio coverage for DL and optionally UL packet transmissions). The BS may communicate with one or more UEs in the radio communication system via the plurality of cells. A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be called as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), comprising the SpCell and optionally one or more Secondary Cells (SCells). An SCG may refer to a group of serving cells associated with the Secondary Node (SN), comprising of the SpCell and optionally one or more SCells.

As discussed previously, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the $3^{rd}$ Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the network dynamics of NR. Besides, an SL resource may also be provided via an NR frame to support ProSe services or V2X services.

For a RAT deployed on a unlicensed spectrum, any devices (e.g., a UE, BS, and Access Point (AP)) may apply a Listen Before Talk (LBT) mechanism before accessing a channel. The devices may perform a Clear Channel Assessment (CCA) before transmitting on the unlicensed channel. If the LBT fails, the devices may not access the unlicensed channel at a determined time.

NR-based Unlicensed (NR-U) access design also applies the LBT mechanism. The deployment scenarios of NR-based unlicensed access may include:

1. Carrier aggregation between licensed band NR (e.g., PCell) and NR-U (e.g., SCell), where NR-U SCell may have both downlink (DL) and uplink (UL), or DL-only;
2. Dual connectivity between licensed band LTE (e.g., PCell) and NR-U (e.g., PSCell);
3. Stand-alone NR-U;
4. An NR cell with DL in an unlicensed band and UL in a licensed band; and
5. Dual connectivity between licensed band NR (e.g., PCell) and NR-U (e.g., PSCell).

In the next-generation cellular network, there may be multiple Public Land Mobile Network (PLMN)(s) operating on one frequency. Moreover, an unlicensed RAT (e.g., standalone NR-U) is introduced, which means that multiple PLMNs may operate their own cells on the same unlicensed spectrum. Thus, a cell selection or reselection on the unlicensed spectrum should be specified.

For example, the UE may camp on a non-best cell on an unlicensed carrier if the best cell does not belong to the registered PLMN (R-PLMN) (or Equivalent PLMN (E-PLMN)). Thus, how the UE camps on a non-best cell on an unlicensed carrier should be considered.

If the UE applies the legacy PLMN selection and cell selection or reselection mechanism on the unlicensed spectrum for the RAN sharing scenario, the UE may waste time and consume extra power (e.g., for detection and measurement) since the best cell on the unlicensed carrier may not belong to the selected (or equivalent) PLMN. In view of this, a cell selection or selection procedure performed based on White List(s) is provided.

FIG. 1 is a flowchart illustrating a method 100 for cell selection or reselection, according to an implementation of the present disclosure. FIG. 1 illustrates a UE in an RRC idle mode (e.g., "RRC_IDLE") or an RRC inactive mode (e.g., "RRC_INACTIVE") performing cell selection or reselection. In action 102, the UE may determine whether a white list is received from a serving cell, where the white list includes at least one cell identity, each identifying a cell on at least one of an intra-frequency and an inter-frequency corresponding to a frequency that the serving cell is on. In action 104, the UE may perform a measurement on at least one cell associated with the at least one cell identity according to the white list when the UE determines that the white list is received from the serving cell. It is noted that the UE may perform the measurement when the UE receives the white list from the serving cell and at least one of the conditions occur: (1) the UE is operating on an unlicensed frequency, (2) the UE is in an RRC_IDLE/RRC_INACTIVE state, and (3) the cell (re)selection procedure is triggered. In action 106, the UE may select or reselect a cell according to the measurement, the cell indicated only by the at least one cell identity in the white list.

It is noted that a RRC_IDLE/RRC_INACTIVE UE (e.g., a UE in RRC_IDLE/RRC_INACTIVE state) may camp on a cell, whereas a RRC_CONNECTED UE (e.g., a UE in RRC_CONNECTED state) may be served by a cell (e.g., serving cell).

In one implementation, when the UE determines that the white list is not received, the UE may perform a measurement on at least one cell on the frequency (e.g., a licensed frequency or an unlicensed frequency) that the serving cell is on, and may select or reselect a cell on the unlicensed frequency or the licensed frequency according to the measurement. For example, when the UE operating on the unlicensed frequency determines that the white list is not received, the UE may perform a measurement on at least one cell on the licensed frequency.

A white list (e.g., "White List") may be used for an RRC_IDLE or RRC_INACTIVE UE to perform cell (re) selection. A cell may indicate the White List to the UE via system information or dedicated signaling. The cell may indicate to the UE cell(s), area information, PLMN information, and/or frequency information to add, modify or remove in the White List. The cell may indicate to the UE the cell(s), area information, PLMN information, and/or frequency information to remove from the White List. In some implementations, the cell may indicate the validation of the White List to the UE (e.g., the White List may be invalid by default if the cell does not provide any validation indication). The UE may perform measurements based on the information indicated in White List (e.g., while the White List is valid). For example, if the cell(s) indicated in the White List belongs to the allowed PLMNs of the UE, the White List may assist an RRC_IDLE or RRC_INACTIVE UE in evaluations of cells that belong to the allowed PLMNs of the UE. On the other hand, for an NR-U scenario where multiple operators (e.g., PLMN(s)) may operate in an unlicensed frequency, the White List may prevent an RRC_IDLE or RRC_INACTIVE UE from (re)selecting a cell which does not belong to the allowed PLMN of the UE.

In some implementations, the White List may include at least area information. The area information may include a list of Physical Cell Identities (ID)(s) (PCIs), a list of cell identities, a list of RAN Area IDs, a list of RAN Area Code(s) (RANAC)(s), and/or a list of tracking area code(s) (TAC)(s).

In some implementations, the White List may include a list of PCI(s). The cells identified by the list of PCI(s) may constitute the area, where the UE may measure/evaluate the cells in the area. The UE may derive the PCI of a cell upon decoding the synchronization signal (e.g., Primary Synchronization Signal (PSS) and Secondary Synchronization Signal (SSS)) in the Synchronization Signal Block (SSB) of the cell. The SSB may include a PSS, an SSS, and a Physical Broadcast Channel (PBCH). The UE may measure a signal quality of an SSB to determine the signal quality of a cell. The UE may receive and decode the SSB to determine the PCI of a cell. If the UE decodes the PBCH, the UE may further acquire the information in a Master Information Block (MIB). If the Physical Downlink Control Channel (PDCCH) parameters for System Information Block (SIB) Type 1 (SIB1) (e.g., PDCCH-ConfigSIB1 Information Element (IE)) are present in the MIB, the UE may determine a common Control Resource Set (e.g., "CORESET"), a common search space and necessary PDCCH parameters based on the PDCCH parameters for SIB1. The PDCCH parameters for SIB1 (e.g., PDCCH-ConfigSIB1 IE) may be used to configure a CORESET #0 and a search space #0. The CORESET #0 and/or search space #0 may further indicate the resources to the UE to receive SIB1.

If the UE is provided with the White List(s) including a list of PCI(s), the UE may measure the SSB of a cell, and/or decode the PSS/SSS. If the UE determines that the PCI of the cell is one of PCIs in the White List(s), the UE may evaluate the cell (e.g., the UE may read and acquire the SIB1 of the cell). If the UE determines that the PCI of the cell is not one of PCIs in the White List(s), the UE may not further evaluate the cell. The cells which the UE evaluates may be the candidate cells. The UE may (re)select one of the candidate cells based at least on the PCI(s) and/or the cell (re)selection criteria for the cell (re)selection procedure, as the outcome of the cell (re)selection procedure. The cell, which the UE (re)selects, may be a suitable cell or an acceptable cell.

A suitable cell is a cell on which a UE may camp. The UE may consider a cell as suitable if the following conditions are fulfilled: (1) the cell is part of either the selected PLMN or the registered PLMN or PLMN of the Equivalent PLMN list, and (2) the cell selection (S) criteria of the cell are fulfilled. Furthermore, according to the latest information provided via the Non-Access Stratum (NAS) of the UE, the suitable cell is not barred. The suitable cell is part of at least one TA that is not part of the list of "Forbidden Tracking Areas", which belongs to a PLMN that fulfils the condition (1).

An acceptable cell is a cell on which the UE may camp to obtain limited service (e.g., originate emergency calls, and receive Earthquake and Tsunami Warning System (ETWS) and Commercial Mobile Alert System (CMAS) notifications). Such a cell may fulfil the following requirements, which is the minimum set of requirements to initiate an emergency call and to receive ETWS and CMAS notification in an NR network: (1) the cell is not barred, and/or (2) the cell selection criteria are fulfilled.

In some implementations, the list of PCI(s) may be a SEQUENCE format with a size of "N_PCI" (e.g., a maximum number of cells identified by PCI(s) to be measured) entries. The SEQUENCE format may be a data structure specified in Abstract Syntax Notation One (ASN. 1) and used to represent a collection of one or more types/elements/entries. Each entry in the "SEQUENCE" may be a PCI. N_PCI may be a positive integer. "N_PCI" may be (but not limited to) 16 or 32. The camped-on/serving cell of a UE may provide the UE with at most "N_PCI" kinds of PCI(s) allowed to be evaluated for the cell (re)selection procedure.

In some implementations, the list of PCI(s) may be a SEQUENCE format with two entries: one is a PCI as the start value, and another one is a positive/negative integer as the range value. The start value may indicate the lower PCI in the range, if the range value is positive. The start value may indicate the highest PCI in the range, if the range value is negative. The absolute value of the range value may indicate the number of PCI(s) in the range. In one example, if the range value is 4 and the start value is PCI_0, the White List may include PCI_0, PCI_0+1, PCI_0+2, and PCI_0+3. In another example, if the range value is −4 and the start value is PCI_0, the White List may include PCI_0, PCI_0−1, PCI_0−2, and PCI_0−3. If the range value is absent and the start value is PCI_0, the White List may include PCI_0 (only). In some implementations, the range value may be indicated by an ENUMERATED format of a set of defined positive/negative values. In some implementations, the range value may be indicated by a PCI range index (e.g., PCI-RangeIndex), which may be a positive integer between 1 and a maximum number of PCI ranges.

In some implementations, the White List may include a set of PCI(s), which include several lists of PCI(s). Each list of PCI(s) may be any proposed format of PCI list(s) (e.g., SEQUENCE, ENUMERATED, start value, range value, PCI range index). The UE may measure/evaluate cells identified by PCI(s) in the White List(s) for cell (re)selection.

In some implementations, the White List may include a list of the cell identities. The cells identified by the list of cell identities may constitute the area, where the UE may measure/evaluate the cells in the area. A cell identity may be used to identify a cell within a PLMN. The UE may acquire a cell identity of a cell by acquiring the information in SIB1 of the cell. The SIB1 of a cell may include the information related to cell access (e.g., CellAccessRelatedInfo IE). The information related to cell access may include a list of PLMN-specific information (e.g., a list of PLMN-Identity-Info IE). The size of the list of PLMN-specific information may range from one to "N_PLMN", where "N_PLMN" is a positive integer indicating the number of PLMN group(s). A PLMN group may include at least one PLMN. PLMN-specific information may include a list of PLMMN ID(s), at least one TAC, at least one RANAC, and/or at least one cell identity for a set of PLMN(s) (e.g., PLMN group) identified by the list of PLMN ID(s).

If the White List includes a list of cell identities (or if the UE is provided with the White List including a list of cell identities), the UE may measure the SSB of a cell to determine the signal quality, and acquire the information in SIB1 of the cell for at least cell identity. If the UE determines that the cell identity of a cell is one of cell identities in the White List(s) (e.g., by acquiring and reading the SIB1), the UE may continue evaluating the cell (e.g., by reading the cell (re)selection related parameters (e.g., cellSelectionInfo IE) in the SIB1 of the cell). If the UE determines that the cell identity of the cell is not one of cell identities in the White List(s), the UE may not further evaluate the cell. The cells which the UE evaluates may be the candidate cells. The UE may (re)select one of the candidate cells based at least on the cell identity for the cell (re)selection procedure and/or the cell (re)selection criteria, as the outcome of the cell (re) selection procedure.

In some implementations, the list of cell identities in the White List(s) may be in the SEQUENCE format of a size of "N_CID" (e.g., a maximum number of cells identified by the entries of cell identities to be measured) entries. "N_CID" is a positive integer. "N_CID" may be (but not limited to) 32. Each entry may be a cell identity. A cell identity may be a bit string with size 'N_C'. 'N_C' may be (but not limited to) 36. The UE may measure/evaluate cells identified by a cell identity in the White List(s) for cell (re)selection.

In some implementations, the White List may include a list of RANAC(s) (e.g., RAN-AreaCode IE). The list of RANAC(s) may be used to identify a RAN area within the scope of a Tracking Area (TA). The UE may acquire the list of RANAC(s) of a cell by acquiring the information in SIB1 of the cell. The cells identified by the list of RANAC(s) may constitute the area, where the UE may measure/evaluate the cells in the area.

If the White List includes a list of RANAC(s), the UE may measure an SSB of a cell to determine the signal quality, and acquire the information in SIB1 of the cell for at least the list of RANAC(s). If the UE determines that the RANAC of a cell is one of the list of RANAC(s) in the White List(s) (e.g., by acquiring and reading the SIB1), the UE may continue evaluating the cell (e.g., by reading the cell (re)selection related parameters (e.g., cellSelectionInfo IE) in the SIB1 of the cell). If the UE determines that the RANAC of the cell is not one of list of RANAC(s) in the White List(s), the UE may not further evaluate the cell. The cells which the UE evaluates may be the candidate cells. The UE may (re)select one of the candidate cells based at least on the list of RANAC(s) and/or the cell (re)selection criteria for the cell (re)selection procedure, as the outcome of the cell (re) selection procedure.

In some implementations, the list of RANAC(s) in the White List(s) may be in the SEQUENCE format of a size of "N_RANAC" (e.g., a maximum number of the list of RANAC(s) in the White List) entries. "N_RANAC" may be a positive integer. "N_RANAC" may be (but not limited to) 32. Each entry may be a RANAC, an integer ranging from '0' to 'RANAC_max'. 'RANAC_max' may be a positive integer. 'RANAC_max' may be (but not limited to) 255. The UE may measure/evaluate cells identified by the list of RANAC(s) in the White List for cell (re)selection.

In some implementations, the White List may include a list of RAN Area ID(s) (e.g., RAN-AreaConfig IE). The List of RAN Area ID(s) may be used to identify a RAN area. A RAN Area ID may include a TAC and optionally a RANAC. The UE may acquire the List of RAN Area ID(s) of a cell by acquiring the information in SIB1 of the cell. The cells identified by the list of RAN Area IDs may constitute the area, where the UE may measure/evaluate the cells in the area.

If the White List includes a list of RAN Area ID(s) (or if the UE is provided with the White List(s) including a list of RAN Area ID(s)), the UE may measure the SSB of a cell to determine the signal quality, and acquire the information in SIB1 of the cell for at least the List of RAN Area ID(s). If the UE determines that the RAN Area ID of a cell is one of the list of RAN Area ID(s) in the White List (e.g., by acquiring and reading the SIB1), the UE may continue evaluating the cell (e.g., by reading the cell (re)selection related parameters (e.g., cellSelectionInfo IE) in the SIB1 of the cell). If the UE determines that the RAN Area ID of the cell is not one of the list of RAN Area ID(s) in the White List(s), the UE may not further evaluate the cell. The cells which the UE evaluates may be the candidate cells. The UE may (re)select one of the candidate cells based at least on the list of RAN Area ID(s) and/or cell (re)selection criteria for the cell, as the outcome of the cell (re)selection procedure.

In some implementations, the list of RAN Area ID(s) in the White List(s) may be in the SEQUENCE format of a size of "N_RANAreaID" (e.g., maximum number of the list of RAN Area ID(s)) entries. "N_RANAreaID" may be a positive integer. "N_RANAreaID" may be (but not limited to) 16 or 32. Each entry may be a RAN Area ID. A RAN Area ID may be an integer, ranging from '0' to 'RANAreaID_max'. 'RANAreaID_max' may be a positive integer. The UE may measure/evaluate cells identified by the list of RAN Area ID(s) in the White List(s) for cell (re)selection.

In some implementations, the list of RAN Area ID(s) in the White List may include an RAN Area Configuration, which is in the SEQUENCE format including two entries: one is TAC, and another one is a list of RANAC(s) represented by the SEQUENCE format with a size of "N_RANACtoTAC" (e.g., the number of RANAC(s) associated with the same TAC) entries. "N_RANACtoTAC" may be a positive integer. "N_RANACtoTAC" may be (but not limited to) 32. The list of RAN Area ID(s) in the White List(s) may include several RAN Area Configuration(s), where each RAN Area Configuration includes one TAC and the corresponding list of RANAC(s). In some implementations, the list of RAN Area ID(s) in the White List(s) may include at most (but not limited to) 16 RAN Area Configuration(s). The UE may measure/evaluate cells identified by TAC(s) and RANAC(s) in the White List(s) for cell (re)selection.

In some implementations, the White List may include a list of TAC(s). The TAC may be used to identify a TA within a range of a PLMN. The UE may acquire the TAC of a cell by acquiring the information in SIB1 of the cell. The cells identified by the list of TAC(s) may constitute the area, where the UE may measure/evaluate the cells in the area.

If the White List includes a list of TAC(s) (or if the UE is provided with the White List(s) including a list of TAC(s)), the UE may measure an SSB of a cell to determine the signal quality, and acquire the information in SIB1 of the cell for at least the list of TAC(s). If the UE determines that the TAC of a cell is one of the list of TAC(s) in the White List(s) (e.g., by acquiring and reading the SIB1), the UE may continue evaluating the cell (e.g., by reading the cell (re)selection related parameters (e.g., cellSelectionInfo IE) in the SIB1 of the cell). If the UE determines that the TAC of the cell is not one of the list of TAC(s) in the White List(s), the UE may not further evaluate the cell. The cells which the UE evaluates may be the candidate cells. The UE may (re)select one of the candidate cells based at least on the list of TAC(s) and/or cell (re)selection criteria for the cell, as the outcome of the cell (re)selection procedure.

In some implementations, the list of TAC(s) in the White List(s) may be in the SEQUENCE format of a size of "N_TAC" (e.g., a maximum number of the list of TAC(s)) entries. "N_TAC" may be a positive integer. "N_TAC" may be (but not limited to) 16. Each entry may be a TAC. A TAC may be represented as a bit string with size 'TAC_max'. 'TAC_max' may be a positive integer. 'TAC_max' may be (but not limited to) 24. The UE may measure/evaluate cells identified by the list of TAC(s) in the White List(s) for cell (re)selection.

In some implementations, the White List(s) may include PLMN information. The White List may include the PLMN information and the area information (e.g., list of PCI(s), list of cell identities, list of RANAC(s), list of RAN Area ID(s), and/or list of TAC(s)) associated with the PLMN information. In one implementation, the cell may provide PLMN information and White List(s) including area information associated with the PLMN information to the UE, via system information or dedicated signaling. In one implementation, the cell may provide area information and White List(s) including at least one of PLMN information and frequency information associated with the area information to the UE, via system information or dedicated signaling. The area information associated with the PLMN information (e.g., one PLMN identity (or PLMN index), a list of PLMN identities (or PLMN indexes)) may include a list of PCI(s), a list of cell identities, a list of RANAC(s), a list of RAN Area ID(s), and/or a list of TAC(s). In one implementation, the area information and the associated PLMN information may be in the (same or different) White List(s). In one implementation, only the area information may be in the White List(s), while the associated PLMN information may not be.

For example, if a cell is operated by at least two PLMNs (e.g., in the RAN sharing case), the cell may broadcast at least two PLMN identities in SIB1. The cell may also provide White List(s) for one PLMN and other White List(s) for another PLMN. The cell may indicate the White List(s) to UEs, which camp on or are served by the cell. The UEs, which camp on or are served by the cell, may register or select different PLMN(s) that may operate the cell. These PLMNs or the E-PLMNs of these PLMNs may operate the (same) cell.

In some implementations, if the cell indicates the White List(s) to UEs via system information, which may be broadcasted by the cell, unicasted by the cell and/or provided when requested by the UE, the UE may receive the White List(s) including PLMN information, where the PLMN information indicates the corresponding PLMNs operating the cell. Alternatively, the UE may receive the PLMN information and the White List(s) associated with the PLMN information. The UE may store and/or apply the White List with (or including) PLMN information associated with its allowed PLMN(s). The UE may ignore and/or remove and/or discard the White List(s) with (or including) the PLMN information not associated with its allowed PLMN(s).

In some implementations, if the cell indicates the White List(s) to UEs via dedicated signaling, the UE may receive only the White List with (or including) PLMN information associated with its allowed (or selected) PLMN(s). The UE may receive the PLMN information associated with its allowed PLMN(s) and the White List(s) associated with the PLMN information. In some implementations, if the cell indicates the White List(s) to UEs via dedicated signaling, the UE may receive the White List with (or including) PLMN information associated with its allowed PLMN(s) and/or other forbidden PLMN(s). The UE may receive the White List and PLMN information associated with its allowed PLMN and/or other forbidden PLMN(s) in the same RRC message or in different RRC message(s) respectively. The UE may store and/or apply the White List(s) with PLMN information associated with its allowed PLMN(s). The UE may store and/or apply the PLMN information associated with its allowed PLMN(s) and White List(s) with PLMN information associated with its allowed PLMN(s). The UE may ignore and/or remove and/or discard the White List(s) not associated with its allowed PLMN(s). The UE may ignore and/or remove and/or discard the PLMN information not associated with its allowed PLMN(s). In some implementations, a UE may report its allowed PLMN(s) (e.g., in response to a network (NW) request (i.e., the UE may receive the request via an RRC message, a NAS message, a downlink control information (DCI) or a Medium Access Control (MAC) control element (CE) from the NW before the UE reports its allowed PLMN(s)), or without NW request (i.e., the UE may not receive the request via an RRC message, a NAS message, a DCI or an MAC CE from the NW before the UE reports its allowed PLMN(s))) via the dedicated signaling. Based on the information of allowed PLMN(s) of the UE, the NW may decide which White List(s) to provide to the UE, if required.

In some implementations, if the cell is operated by one PLMN, the White List(s) which the cell indicates to the UE may not include the PLMN information or may not be associated to the PLMN information. If the UE receives the White List(s) without PLMN information in the White List(s) or without PLMN information associated with the White List(s), the UE may determine that the cell is operated by one PLMN. The UE may determine that the information in the White List(s) is associated with the PLMN of the cell, where the identity of PLMN of the cell is broadcast by the cell in SIB1. Alternatively, the UE may determine that the information in the White List(s) is associated with the UE's allowed PLMNs(s). In one implementations, if the UE (only) reads one PLMN identity/index of the cell in SIB1 (e.g., the cell is operated by one PLMN), the UE may receive the White List(s) without PLMN information in the White List(s) or without PLMN information associated with the White List(s). When the UE measures/evaluates cells based on the White List(s) during a cell (re)selection procedure, the UE may check whether the PLMN ID(s) broadcast by the evaluated cells are the same as the PLMN ID broadcast by the cell which indicates the White List(s) to the UE. That is, even though the White List(s) does not include the PLMN information, the UE may acquire the PLMN information broadcast by the evaluated cells in SIB1 to check whether the evaluated cells are operated by allowed PLMN(s). In some implementations, if the UE receives the White List(s) without PLMN information in the White List(s) or without PLMN information associated with the White List(s), the UE may not check whether the PLMN ID(s) broadcast by the evaluated cells are the same as the PLMN ID broadcast by the cell which indicates the White List(s) to the UE, when the UE measures/evaluates cells based on the White List(s) during cell a (re)selection procedure. In some implementations, if the UE receives the White List(s) without PLMN information in the White List(s) or without PLMN information associated with the White List(s), the UE may assume the cells (indicated by the area information) listed in the White List(s) are candidates (i.e., candidate cells) as suitable cells. The suitable cells may be (1) cells which are part of either the selected PLMN, the registered PLMN or the PLMN of the Equivalent PLMN list, (2) cells which are not barred, and/or (3) cells which are part of at least one TA that is not part of the list of "Forbidden Tracking Areas", which belongs to a PLMN that fulfils (1) above. Once the UE performs measurement on the candidate cells and the cell selection criteria and/or the cell reselection criteria of the candidate cells are fulfilled, the UE may determine the candidate cells meeting the cell selection criteria and/or cell reselection criteria such that the UE may camp on or connect to the best cell in terms of a radio condition as candidate cells, among which the UE may (re)select a cell as the outcome of the cell (re)selection procedure. For the cell reselection criteria (e.g., R criteria), the UE may apply the measured signal strength of the serving/camped-on cell and neighboring cells, and determine the rank of each cell based on the measured signal strength of each cell. The UE may determine whether to select a cell based on the rank and specific rules according to the rank.

In some implementations, PLMN information in the White List(s) may be represented by PLMN identities. A PLMN identity may include Mobile Country Code (MCC) and Mobile Network Code (MNC), where MCC may be optional. MCC may be a three-digit value, and MNC may be a two-digit or three-digit value.

In some implementations, the PLMN information in the White List(s) may be represented by a PLMN index. The PLMN index may correspond to the index of a PLMN identity list (e.g., PLMN-IdentityList IE) in the SIB1 broadcast by the cell, which provides the White List(s) to the UE. The PLMN index may be zero or a positive integer.

In one implementation, a PLMN identity (or a PLMN index) may be associated with the corresponding area information (e.g., list of PCI(s), list of cell identities, list of RANAC(s), list of RAN Area ID(s), list of TAC(s)). A PLMN identity (or a PLMN index) and its corresponding area information may be included in a PLMN-specific Configuration in the White List. In some implementations, a PLMN identity (or a PLMN index) and the associated White List(s) including the area information may be included in a PLMN-specific Configuration. A PLMN ID (or a PLMN index) may be included in the associated White List(s).

In one implementation, a list of PLMN identities (or a list of PLMN indexes) may be associated with the corresponding area information. A list of PLMN identities (or a list of PLMN indexes) may be represented by the SEQUENCE format with the size between '1' and 'N_PLMN' (e.g., a maximum number of PLMNs operating the cell). 'N_PLMN' may be a positive integer. 'N_PLMN' may be (but not limited to) 12. A list of PLMN identities (or a list of PLMN indexes) and the corresponding area information may be included in a PLMN-specific Configuration in the White List(s). In some implementations, a list of PLMN identities (or a list of PLMN indexes) and the associated White List(s) including the area information may be included in a PLMN-specific Configuration. A list of PLMN identities (or a list of PLMN indexes) may be included in the associated White List(s).

During a cell (re)selection, if the UE is provided with the PLMN information in the White List(s) or PLMN information associated with the White List(s), the UE may measure an SSB of a cell to determine a signal quality of the cell. The cell may be indicated by the PLMN information in the White List(s) or by the PLMN information associated with the White List(s). The UE may acquire the information in SIB1 of the cell for at least PLMN identity/index. The UE may acquire the information in SIB1 of the cell for at least cell identity, RANAC, RAN Area ID, and/or TAC, associated with the PLMN information. If the UE determines that the PLMN information of a cell is indicated in the White List(s) or is the same as the indicated PLMN information associated with the White List(s), the UE may continue evaluating the cell. If the UE determines that the cell identity, RANAC, RAN Area ID, and/or TAC of a cell is associated with the PLMN information (e.g., by acquiring and reading the SIB1), the UE may continue evaluating the cell (e.g., by reading the cell (re)selection related parameters (e.g., cellSelectionInfo IE) in the SIB1 of the cell). If the UE determines that the PLMN information of a cell is not indicated in the White List(s) or is different from the indicated PLMN information associated with the White List(s), the UE may not further evaluate the cell. If the UE determines that the cell identity, RANAC, RAN Area ID, and/or TAC of a cell is not associated with the PLMN information, the UE may not further evaluate the cell. The cells which the UE evaluates may be the candidate cells. The UE may (re)select one of the candidate cells based at least on the PLMN information and/or cell (re)selection criteria, as the outcome of the cell (re)selection procedure.

In some implementations, the White List(s) may include frequency information. The White List may include the frequency information and the area information (e.g., list of PCI(s), list of cell identities, list of RANAC(s), list of RAN Area ID(s), and/or list of TAC(s)) associated with the frequency information. In one implementation, the cell may provide frequency information and White List including area information associated with the frequency information to the UE, via system information or dedicated signaling. The area information associated with the frequency information (e.g., Absolute Radio Frequency Channel Number (ARFCN) value, frequency band list, licensed/unlicensed indicator) may include a list of PCI(s), a list of cell identities, a list of RANAC(s), a list of RAN Area ID(s), and/or a list of TAC(s). In one implementation, the area information and the associated frequency information may both be in the White List(s). In one implementation, only the area information may be in the White List(s), white the associated frequency information may not be.

In some implementations, if the UE receives the frequency information and the area information associated with the frequency information, the UE may measure a signal on a frequency indicated by the frequency information, and search for the cells indicated by the area information associated with the frequency information. The UE may determine a cell with good signal quality which is one of the cells indicated as the candidate cells by the area information associated with the frequency information. The UE may (re)select a cell from the candidate cells based on at least the frequency information and/or the cell (re)selection criteria, as the outcome of the cell (re)selection procedure. The good signal quality may refer to (but not limited to) that the measured signal of the cell is equal or above a signal quality/strength threshold, and/or that the cell satisfies S criteria.

In some implementations, the White List may include the frequency information and the PLMN information (e.g., (a list of) PLMN identity(-ies), (a list of) PLMN index(es)) associated with the frequency information. In one implementation, the cell may provide frequency information and White List(s) including PLMN information associated with the frequency information to the UE, via system information or dedicated signaling. In one implementation, the cell may provide frequency information, PLMN information associated with the frequency information, and White List(s) associated with the frequency information, to the UE, via system information or dedicated signaling. The PLMN information associated with the frequency information (e.g., ARFCN value, frequency band list, licensed/unlicensed indicator) may include a (list of) PLMN identity(-ies) and/or a (list of) PLMN index(es). In one implementation, the PLMN information and the associated frequency information may both be in the White List(s). In one implementation, only the PLMN information may be in the White List, white the associated frequency information may not be.

In some implementations, if the UE receives the frequency information and the PLMN information associated with the frequency information, the UE may measure a signal on a frequency indicated by the frequency information, and search for the cells indicated by the PLMN information associated with the frequency information. The UE may determine a cell with good signal quality which is one cell of cells indicated as the candidate cells by the PLMN information associated with the frequency information. The UE may (re)select a cell from the candidate cells based on at least the frequency information and/or cell (re)selection criteria, as the outcome of the cell (re)selection procedure.

In some implementations, when the UE receives the frequency information, the UE may store and/or apply the frequency information, which indicates the frequency band(s) the UE supports, and the associated PLMN information and/or associated area information for the cell (re)selection procedure. When the UE receives the frequency information, the UE may remove and/or discard the frequency information, which indicates the frequency bands that the UE does not support, and the associated PLMN information and/or associated area information.

In some implementations, the frequency information may include the common cell (re)selection parameters (e.g., additionalPmax used for the calculation of $P_{compensation}$, $P_{EMAX,\ 1}$ and $P_{EMAX,\ 2}$, and additionalSpectrumEmission) associated with the frequency-related parameters in the frequency information.

The frequency information associated with the area information (and/or PLMN information) may be the Radio Frequency (RF) reference frequency used to identify the position of RF channels, SSBs and other elements. The frequency information associated with the area information (and/or PLMN information) may be an ARFCN value. The value of the frequency information may be zero or a positive integer, ranging from '0' to the maximum ARFCN value. For example, the maximum ARFCN value for an NR carrier frequency is '3279165'. The UE may measure the reference signal (e.g., SSB, Channel State Information-Reference Signal (CSI-RS), Tracking Reference Signal (TRS)) on the frequency indicated by the frequency information. The frequency indicated by the ARFCN value may be a licensed frequency or unlicensed frequency.

The frequency information associated with the area information (and/or PLMN information) may be the frequency band number. The frequency band number may indicate the frequency band in which the reference signal (e.g., SSB, CSI-RS, TRS) is located. The frequency band number may be RAT specific. For example, the NR frequency band number and LTE frequency band number may be different. The start value(s) and end value(s) for the NR frequency band number and LTE frequency band number may be different. The same value of the NR frequency band and the LTE frequency band may correspond to different frequency bands. The UE may perform measurement for the reference signal on the frequency band indicated by the frequency band number. The value of the frequency information may be zero or a positive integer, ranging from '0' to the maximum frequency band number value. For example, the maximum frequency band number for the NR carrier frequency is '1024'. The UE may measure the reference signal (e.g., SSB, CSI-RS, TRS) on the frequency band indicated by the frequency information. The frequency indicated by the frequency band number may be a licensed frequency or unlicensed frequency.

The frequency information associated with the area information (and/or PLMN information) may include an unlicensed/licensed indicator. The unlicensed/licensed indicator may indicate whether the frequency associated with the area information (and/or PLMN information) is licensed or unlicensed. The unlicensed/licensed indicator may be a Boolean value (e.g., '1' means licensed, '0' means unlicensed, and vice versa). The unlicensed/licensed indicator may be an ENUMEATE format used in ASN. 1. The ENUMEATE format may be used for a choice within a limited set of possible values (e.g., "unlicensed" and "licensed"). For example, if the configuration is ENUMERATED(licensed), both ENUMERATED(licensed) and 'licensed' may mean that the frequency is licensed, while an absent value for the configuration may be that the frequency is unlicensed. For another example, if the configuration is ENUMERATED (unlicensed), both ENUMERATED(unlicensed) and 'unlicensed' may mean that the frequency is unlicensed, while an absent value for the configuration may be that the frequency is licensed. For another example, if the configuration is ENUMERATED(licensed, unlicensed), both ENUMERATED(licensed) and 'licensed' may mean that the frequency is licensed, while ENUMERATED(unlicensed) and 'unlicensed' may mean that the frequency is unlicensed. The absence of the unlicensed/licensed indicator may mean that the frequency is unlicensed. Alternatively, the absence of the unlicensed/licensed indicator may mean that the frequency is licensed. The UE may measure the reference signal (e.g., SSB, CSI-RS, TRS) on the supported licensed (or unlicensed) frequency based on the unlicensed/licensed indicator.

In some implementations, the frequency information associated with the area information (and/or PLMN information) may include a list of frequency indicators. The frequency indicators may be (but not limited to) in the form of an ARFCN value, a frequency band value, and an unlicensed/licensed indicator. Each frequency indicator may include the common cell (re)selection parameters (e.g., additionalPmax used for the calculation of $P_{compensation}$, $P_{EMAX,\ 1}$ and $P_{EMAX,\ 2}$, and additionalSpectrumEmission) associated with the frequency-related parameters in the frequency indicator. The frequency information may include the common cell (re)selection parameters associated with the frequencies indicated by the list of frequency indicators. The size of the list of frequency indicators may range from 1 to the maximum number of frequency bands supported by the cell, which may transmit the list of frequency indicators. The size of the list of frequency indicators may range from 1 to the maximum number of frequency bands supported by the UE, which may receive the list of frequency indicators. The UE may transmit its maximum number of supported frequency bands and/or the corresponding frequency band information to the cell, via dedicated signaling (e.g., an RRC message, a UE capability message).

In some implementations, when the UE receives the list of frequency indicators, the UE may store and/or apply the an list of frequency indicators, which indicates the frequency bands the UE supports, and the associated PLMN information and/or associated area information for the cell (re) selection procedure. When the UE receives the list of frequency indicators, the UE may remove and/or discard any frequency indicator, which indicates the frequency bands that the UE does not support, and the associated PLMN information and/or associated area information.

In some implementations, the UE may measure the reference signal (e.g., SSB, CSI-RS, TRS) on the indicated frequencies based on the list of frequency indicators and/or based on the UE's capability of supporting frequency bands. The UE may determine the cells on the indicated frequencies with good signal quality which are cells that match the associated area information (and/or PLMN information), as candidate cells. The UE may (re)select a cell from the candidate cell(s), as the outcome of the cell (re)selection procedure. The good signal quality may refer to (but not limited to) that the measured signal of the cell is equal or above a signal quality/strength threshold, and/or that the cell satisfies S criteria.

In some implementations, the White List(s) may include at least two IE(s). For example, one IE may include the required information for cell (re)selection on one RAT (e.g., NR). The other IE may include the required information for cell (re)selection on another RAT (e.g., E-UTRA, NR-U). The required information may refer to (but not limited to) the PLMN information, area information, NAS information, and/or frequency information.

Various methods for a cell to transmit a White List to a UE is disclosed.

The cell may broadcast the White List (e.g., including area information and/or PLMN information and/or frequency information) in SIB1, SIB3, SIB4, SIB5, and/or other SIB(s), to the UE. The cell may broadcast the PLMN information associated with the White List in SIB1, SIB3, SIB4, SIB5, and/or other SIB(s), to UE. The cell may broadcast the frequency information associated with the White List in SIB1, SIB3, SIB4, SIB5, and/or SIB(s), to UE.

In other words, the UE may receive the White List (e.g., including area information and/or PLMN information and/or frequency information) in SIB1, SIB3, SIB4, SIB5, and/or other SIB(s), from the cell. The UE may receive the PLMN information associated with the White List in SIB1, SIB3, SIB4, SIB5, and/or other SIB(s), from the cell. The UE may receive the frequency information associated with the White List in SIB1, SIB3, SIB4, SIB5, and/or other SIB(s), from the cell. In some implementations, the UE may check whether a status of other SI (e.g., SIB3, SIB4, SIB5, and/or other SIB(s)) is broadcast by an indicator in SIB1. If other SI is broadcast, the UE may receive other SI. If other SI is not broadcast, the UE may perform an SI request procedure and request other SI.

In some implementations, the UE may receive the White List(s), and/or PLMN information associated with the White List(s), and/or the frequency information associated with the White List(s), in SIB3 from a cell, when the frequency (explicitly or implicitly) indicated by the frequency information is the intra-frequency corresponding to the frequency on which the UE camps or operates. In some implementations, the intra-frequency of a frequency may be the same as the frequency or may (partially) overlap the frequency.

In some implementations, if the frequency information associated with the White List(s) in SIB3 is absent or no frequency information is associated with the White List(s) in SIB3, the UE may determine that the White List(s) associated with the intra-frequency corresponds to the frequency on which the UE camps or operates.

The UE may perform the intra-frequency cell (re)selection based on the White List(s) received in SIB3 from a cell. The UE may receive the PLMN information and/or frequency information associated with the White List(s) in SIB1, SIB3, and/or other SI, from the cell. The UE may perform intra-frequency cell (re)selection based on the received PLMN information and/or frequency information associated with the White List(s), where the UE receives the White List(s) in SIB3.

In some implementations, the UE may receive the White List(s), and/or PLMN information associated with the White List(s), and/or the frequency information associated with the White List(s), in SIB4 from a cell, when the frequency (explicitly or implicitly) indicated by the frequency information is the inter-frequency corresponding to the frequency on which the UE camps or operates. In some implementations, the inter-frequency of a frequency may be different from the frequency, may (partially) overlap the frequency, or may not overlap the frequency.

In some implementations, if the frequency information associated with the White List(s) in SIB4 is absent or no frequency information is associated with the White List(s) in SIB4, the UE may compare the White List(s) in SIB4 associated with the inter-frequency to the frequency on which the UE camps or operates. The UE may determine a frequency band, which the UE supports, other than the frequency on which the UE camps or operates, as the frequency band(s) associated with the White List(s) in SIB4.

The UE may perform the inter-frequency cell (re)selection based on the White List(s) received in SIB4 from a cell. The UE may receive the PLMN information and/or frequency information associated with the White List(s) in SIB1, SIB4, and/or other SI, from the cell. The UE may perform inter-frequency cell (re)selection based on the received PLMN information and/or frequency information associated with the White List(s), where the UE receives the White List(s) in SIB4.

In some implementations, the UE may receive the White List(s), and/or PLMN information associated with the White List(s), and/or the frequency information associated with the White List(s), in SIB5 from a cell, when the frequency (explicitly or implicitly) indicated by the frequency information is the inter-RAT frequency corresponding to the frequency on which the UE camps or operates. The inter-RAT frequency may be an intra-frequency or inter-frequency compared to the frequency on which the UE camps or operates. In some implementations, the RAT operating on the inter-RAT frequency of a frequency may be different from the RAT operating on the frequency.

In some implementations, if the frequency information associated with the White List(s) in SIB5 is absent or no frequency information is associated with the White List(s) in SIB5, the UE may compare the White List(s) in SIB5 associated with the intra-frequency to the frequency on which the UE camps or operates. The UE may perform the intra-frequency inter-RAT cell (re)selection based on the White List(s) received in SIB5 from a cell.

In some implementations, if the frequency information associated with the White List(s) in SIB5 is absent or no frequency information is associated with the White List(s) in SIB5, the UE may compare the White List(s) in SIB5 associated with the inter-frequency to the frequency on which the UE camps or operates. The UE may determine a frequency band, which the UE supports, other than the frequency on which the UE camps or operates, as the frequency band(s) associated with the White List(s) in SIB5. The UE may perform the inter-frequency inter-RAT cell (re)selection based on the White List(s) received in SIB5 from a cell.

The UE may perform the inter-RAT cell (re)selection based on the White List(s) received in SIB5 from a cell. The UE may receive the PLMN information and/or frequency information associated with the White List(s) in SIB1, SIB5, and/or other SI, from the cell. The UE may perform inter-RAT cell (re)selection based on the received PLMN information and/or frequency information associated with the White List(s), where the UE receives the White List(s) in SIB5.

In some implementations, the UE may receive the White List(s), and/or PLMN information associated with the White List(s), and/or the frequency information associated with the White List(s), in SIB1 from a cell, when the frequency (explicitly or implicitly) indicated by the frequency information is the intra-frequency (or inter-frequency, inter-RAT intra-frequency, or inter-RAT inter-frequency) corresponding to the frequency on which the UE camps or operates.

In some implementations, if the frequency information associated with the White List(s) in SIB1 is absent or no frequency information is associated with the White List(s) in SIB1, the UE may compare the White List(s) in SIB1 associated with the intra-frequency (or inter-frequency, inter-RAT intra-frequency, or inter-RAT inter-frequency) to the frequency on which the UE camps or operates. If the association is the inter-frequency or inter-RAT inter-frequency, the UE may determine a frequency band, which the UE supports, other than the frequency on which the UE camps or operates, as the frequency band(s) associated with the White List(s) in SIB1.

The UE may perform the intra-frequency (or inter-frequency, inter-RAT intra-frequency, or inter-RAT inter-frequency) cell (re)selection based on the White List(s) received in SIB1 from a cell. The UE may receive the PLMN information and/or frequency information associated with the White List(s) in SIB1, and/or other SI, from the cell. The UE may perform the intra-frequency (or inter-frequency, inter-RAT intra-frequency, or inter-RAT inter-frequency) cell (re)selection based on the received PLMN information and/or frequency information associated with the White List(s), where the UE receives the White List(s) in SIB1.

In some implementations, the UE may receive the White List(s) used for intra-frequency cell (re)selection procedure in SIB1. In some implementations, the UE may receive the White List(s) used for intra-frequency cell (re)selection procedure in SIB3. In some implementations, the UE may receive one White List used for intra-frequency cell (re)selection procedure in SIB1, and another White List used for intra-frequency cell (re)selection procedure in SIB3. The cell(s) or area(s) indicated by the White List received in SIB1 may be a subset of the cell(s) or area(s) indicated by the White List received in SIB3. The cell(s) or area(s) indicated by the White List received in SIB1 may be the same as the cell(s) or area(s) indicated by the White List received in SIB3. In some implementations, if the UE successfully receives the White List in SIB3, the UE may (store and) apply the White List received in SIB3, rather than the White List received in SIB1, for intra-frequency cell (re)selection. In some implementations, if the UE successfully receives the White List in SIB3, the UE may (store and) apply the White List received in SIB3 for intra-frequency cell (re)selection, and ignore (or remove) the White List received in SIB1 afterwards.

In some implementations, once the UE successfully receives the White List(s) in SIB1, the UE may (store and) apply the White List(s) received in SIB1 for intra-frequency cell (re)selection. Once the UE successfully receives the White List(s) in SIB3, the UE may (store and) apply the White List(s) received in SIB3 for intra-frequency cell (re)selection. That is, the UE may (store and) apply the White List(s) received in any SIB(s) (e.g., SIB1, SIB3) to replace the White List(s) previously received (or stored), for intra-frequency cell (re)selection. Alternatively, the UE may (store and) apply the White List(s) received in any SIB(s) (e.g., SIB1, SIB3), and remove (or ignore) the White List(s) previously received (or stored), for intra-frequency cell (re)selection.

In some implementations, the UE may receive the White List used for inter-frequency cell (re)selection procedure in SIB1. In some implementations, the UE may receive the White List used for inter-frequency cell (re)selection procedure in SIB4. In some implementations, the UE may receive one White List used for inter-frequency cell (re)selection procedure in SIB1, and another White List used for inter-frequency cell (re)selection procedure in SIB4. The cell(s) or area(s) indicated by the White List received in SIB1 may be a subset of the cell(s) or area(s) indicated by the White List received in SIB4. The cell(s) or area(s) indicated by the White List received in SIB1 may be the same as the cell(s) or area(s) indicated by the White List received in SIB4. In some implementations, if the UE successfully receives the White List in SIB4, the UE may (store and) apply the White List received in SIB4, rather than the White List received in SIB1, for inter-frequency cell (re)selection. In some implementations, if the UE successfully receives the White List in SIB4, the UE may (store and) apply the White List received in SIB4 for inter-frequency cell (re)selection, and ignore (or remove) the White List received in SIB1 afterwards.

In some implementations, once the UE successfully receives the White List(s) in SIB1, the UE may use the White List(s) received in SIB1 for inter-frequency cell (re)selection. In some implementations, once the UE successfully receives the White List(s) in SIB4, the UE may use the White List(s) received in SIB4 for inter-frequency cell (re)selection. That is, the UE may (store and) apply the White List(s) received in any SIB(s) (e.g., SIB1, SIB4) to replace the White List(s) previously received (or stored), for inter-frequency cell (re)selection. Alternatively, the UE may (store and) apply the White List(s) received in any SIB(s) (e.g., SIB1, SIB4), and remove (or ignore) the White List(s) previously received (or stored), for inter-frequency cell (re)selection.

In some implementations, the UE may receive the White List used for inter-RAT (inter-frequency or intra-frequency) cell (re)selection procedure in SIB1. In some implementations, the UE may receive the White List used for inter-RAT (inter-frequency or intra-frequency) cell (re)selection procedure in SIB5. In some implementations, the UE may receive one White List used for inter-RAT (inter-frequency or intra-frequency) cell (re)selection procedure in SIB1, and another White List used for inter-RAT (inter-frequency or intra-frequency) cell (re)selection procedure in SIB5. The cell(s) or area(s) indicated by the White List received in SIB1 may be a subset of the cell(s) or area(s) indicated by the White List received in SIB5. The cell(s) or area(s) indicated by the White List received in SIB1 may be the same as the cell(s) or area(s) indicated by the White List received in SIB5. In some implementations, if the UE successfully receives the White List in SIB5, the UE may (store and) apply the White List received in SIB5, rather than the White List received in SIB1, for inter-RAT (inter-frequency or intra-frequency) cell (re)selection. In some implementations, if the UE successfully receives the White List in SIB5, the UE may (store and) apply the White List received in SIB5 for inter-RAT (inter-frequency or intra-frequency) cell (re)selection, and ignore (or remove) the White List received in SIB1 afterwards.

In some implementations, once the UE successfully receives the White List(s) in SIB1, the UE may (store and) apply the White List(s) received in SIB1 for inter-RAT (inter-frequency or intra-frequency) cell (re)selection. In some implementations, once the UE successfully receives the White List(s) in SIB5, the UE may (store and) apply the White List(s) received in SIB5 for inter-RAT (inter-frequency or intra-frequency) cell (re)selection. That is, the UE may (store and) apply the White List(s) received in any SIB(s) (e.g., SIB1, SIB5) to replace the White List(s) previously received (or stored), for inter-RAT (inter-frequency or intra-frequency) cell (re)selection. Alternatively, the UE may (store and) apply the White List(s) received in any SIB(s) (e.g., SIB1, SIB5), and remove (or ignore) the White List(s) previously received (or stored), for inter-RAT (inter-frequency or intra-frequency) cell (re)selection.

The proposed implementations may also be applicable for the cases where the UE may receive the White List in SIB1 and/or the White List from other SI (e.g., SIB3, SIB4, SIB5, other SIB(s)), where the White List is used for the same purpose (e.g., intra-frequency cell (re)selection, inter-frequency cell (re)selection, inter-RAT intra-frequency cell (re)selection, inter-RAT inter-frequency cell (re)selection).

In some implementations, the UE may receive the White List(s), and/or PLMN information associated with the White List(s), and/or the frequency information associated with the White List(s), via dedicated signaling from a cell, when the frequency (explicitly or implicitly) indicated by the frequency information is the intra-frequency, inter-frequency, inter-RAT intra-frequency, and/or inter-RAT inter-frequency corresponding to the frequency on which the UE camps or operates. The inter-RAT frequency may be intra-frequency or inter-frequency compared to the frequency on which the UE camps or operates. The White List(s), and/or PLMN information associated with the White List(s), and/or the frequency information associated with the White List(s), that the UE receives via dedicated signaling from a cell, may be referred to as "UE-specific" White List(s), and/or "UE-specific" PLMN information associated with the "UE-specific" White List(s), and/or "UE-specific" frequency information associated with the "UE-specific" White List(s).

In some implementations, the UE may receive the "UE-specific" White List(s) via dedicated signaling from a cell, while the UE may receive the "cell-specific" PLMN information associated with the "UE-specific" White List(s) and/or the "cell-specific" frequency information associated with the "UE-specific" White List(s) via the system information (e.g., SIB1, SIB3, SIB4, SIB5, other SIB(s).)

In some implementations, the RRC_CONNECTED UE (i.e., the UE in RRC_CONNECTED state) may receive the "UE-specific" White List(s), and/or the "UE-specific" PLMN information associated with the "UE-specific" White List(s), and/or the "UE-specific" frequency information associated with the "UE-specific" White List(s), via an RRC message (e.g., RRC (Connection) Reconfiguration message).

In some implementations, the RRC_CONNECTED UE may receive the "UE-specific" White List(s), and/or the "UE-specific" PLMN information associated with the "UE-specific" White List(s), and/or the "UE-specific" frequency information associated with the "UE-specific" White List(s), via an RRC message (e.g., RRC (Connection) Release message), and perform state transition to enter RRC_IDLE state.

In some implementations, the RRC_CONNECTED UE may receive the "UE-specific" White List(s), and/or the "UE-specific" PLMN information associated with the "UE-specific" White List(s), and/or the "UE-specific" frequency information associated with the "UE-specific" White List(s), via an RRC message (e.g., in the suspend configuration within RRC (Connection) Release with suspend configuration message), and perform state transition to enter RRC_INACTIVE state.

In some implementations, the RRC_INACTIVE UE (i.e., the UE in RRC_INACTIVE state) may receive the "UE-specific" White List(s), and/or the "UE-specific" PLMN information associated with the "UE-specific" White List(s), and/or the "UE-specific" frequency information associated with the "UE-specific" White List(s), via an RRC message (e.g., RRC (Connection) Release message), and perform state transition to enter RRC_IDLE state.

In some implementations, the RRC_INACTIVE UE may receive the "UE-specific" White List(s), and/or the "UE-specific" PLMN information associated with the "UE-specific" White List(s), and/or the "UE-specific" frequency information associated with the "UE-specific" White List(s), via an RRC message (e.g., RRC (Connection) Reject message), where the RRC message (e.g., RRC (Connection) Reject message) is in response to another RRC message (e.g., RRC (Connection) Resume Request message, RRC (Connection) Resume Request 1 message) transmitted by the UE to the cell.

In some implementations, the RRC_IDLE UE (i.e., the UE in RRC_IDLE state) may receive the "UE-specific" White List(s), and/or the "UE-specific" PLMN information associated with the "UE-specific" White List(s), and/or the "UE-specific" frequency information associated with the "UE-specific" White List(s), via an RRC message (e.g., RRC (Connection) Reject message), where the RRC message (e.g., RRC (Connection) Reject message) is in response to another RRC message (e.g., RRC (Connection) Setup Request message) transmitted by the UE to the cell.

In one implementation, the UE may (only) receive the "cell-specific" White List(s) used for intra-frequency, inter-frequency, and/or inter-RAT (inter-frequency or intra-frequency) cell (re)selection procedure(s) via the system information. In some implementations, the UE may (only) receive the "UE-specific" White List(s) used for an intra-frequency, inter-frequency, and/or inter-RAT (inter-frequency or intra-frequency) cell (re)selection procedure via dedicated signaling. In some implementations, the UE may receive "cell-specific" White List(s) used for intra-frequency, inter-frequency, and/or inter-RAT (inter-frequency or intra-frequency) cell (re)selection procedure(s) via the system information, and other "UE-specific" White List(s) used for intra-frequency, inter-frequency, and/or inter-RAT (inter-frequency or intra-frequency) cell (re)selection procedure(s) via dedicated signaling. The cell(s) or area(s) indicated by the "cell-specific" White List(s) received via the system information may be a subset of the cell(s) or area(s) indicated by the "UE-specific" White List(s) received via dedicated signaling. The cell(s) or area(s) indicated by the "cell-specific" White List(s) received via the system information may be the same as the cell(s) or area(s) indicated by the "UE-specific" White List(s) received via dedicated signaling. Some of the cell(s) or area(s) indicated by the "cell-specific" White List(s) received via the system information may be the same as some of the cell(s) or area(s) indicated by the "UE-specific" White List(s) received via dedicated signaling. In some implementations, if the UE successfully receives the "UE-specific" White List(s) via dedicated signaling, the UE may (store and) apply the "UE-specific" White List(s) received via dedicated signaling, rather than the "cell-specific" White List(s) received via the system information, for intra-frequency, inter-frequency, and/or inter-RAT (inter-frequency or intra-frequency) cell (re)selection procedure(s). In some implementations, if the UE successfully receives the "UE-specific" White List(s) via dedicated signaling, the UE may (store and) apply the "UE-specific" White List(s) received via dedicated signaling for intra-frequency, inter-frequency, and/or inter-RAT (inter-frequency or intra-frequency) cell (re)selection procedure(s), and ignore (or remove) the "cell-specific" White List(s) received via the system information afterwards.

In some implementations, once the UE successfully receives the "cell-specific" White List(s) via the system information, the UE may (store and) apply the "cell-specific" White List(s) received via system information for intra-frequency, inter-frequency, and/or inter-RAT (inter-frequency or intra-frequency) cell (re)selection procedure (s). In some implementations, once the UE successfully receives the "UE-specific" White List(s) via dedicated signaling, the UE may (store and) apply the "UE-specific" White List(s) received via dedicated signaling for intra-frequency, inter-frequency, and/or inter-RAT (inter-frequency or intra-frequency) cell (re)selection procedure(s). That is, the UE may (store and) apply the White List(s) received via any control signaling (e.g., system information, dedicated signaling) to replace the White List previously received (or stored), for intra-frequency, inter-frequency, and/or inter-RAT (inter-frequency or intra-frequency) cell (re)selection procedure(s). In some implementations, once the UE successfully receives the "UE-specific" White List(s) via the dedicated signaling, the UE may (store and) apply the "UE-specific" White List(s) received via the dedicated signaling rather than use "cell-specific" White List(s) until the UE moves out of a configured area (e.g., an area indicated by the area information associated with the White List(s)) The UE may apply "cell-specific" White List(s) rather than "UE-specific" White List(s) when the UE moves into a new configured area. The configured area could be a tracking area or a RAN area or a system information area (e.g., defined by a system information area code, systemInformationAreaID). In some implementations, if the White List(s) is provided via dedicated signaling, the UE may ignore (or remove) all the White List(s) provided via system information. In some implementations, if a UE is camped-on any cell state, the UE may (only) apply the White List(s) provided via system information from the current cell. In some implementations, the UE may delete (or remove) White List(s) provided via dedicated signaling when the UE enters a different RRC state, the associated validity timer of the White List(s) expires, or a PLMN selection is performed on request by the NAS of the UE.

However, if the UE does not receive a White List or cannot find any cell indicated by a White List, various methods for the UE to perform cell (re)selection are disclosed.

In some scenarios, during cell (re)selection procedures, the UE may not find a cell with good signal quality that belongs to one of the cells (or cell areas) indicated by the White List(s) provided to the UE by a camped-on/serving cell. The UE may not find candidate cell(s) based on the White List(s) during the cell (re)selection procedure. The good signal quality may refer to (but not limited to) that the measured signal of the cell is equal or above a signal quality/strength threshold, and/or that the cell satisfies S criteria.

In some implementations, the UE may determine that it cannot find candidate cell(s) based on the White List(s) during the cell (re)selection procedure if a timer (e.g., "T_white") expires. The value of T_white may be preconfigured or specified. The value of T_white may be provided to the UE via system information or via dedicated signaling. The value of T_white may be provided to the UE together with the associated White List(s) when the UE receives the associated White List(s). The UE may (re)start the timer (e.g., "T_white") when the UE receives the associated White List(s). The UE may (re)start the timer (e.g., "T_white") when the UE begins to perform the cell (re)selection procedure. When the UE (re)starts the timer (e.g., "T_white"), the UE may set the timer value to a value (e.g., "T_white") preconfigured (or specified or provided) to the UE.

In some implementations, if the UE cannot find any cell indicated by the White List(s), the UE may remove and/or discard the provided/stored White List(s). Additional conditions may be considered when the UE removes and/or discards the provided/stored White List(s).

Condition 1: UE stationary for a time.

In one example, a network/cell may provide the mobility state related parameters (e.g., high-mobility state related parameters, medium-mobility state related parameters, low-mobility state related parameters) to the UE. If the UE detects that it is in a mobility state (e.g., low-mobility state) or the UE detects its speed to be lower than a mobility state related parameter, the UE may consider itself stationary.

In one example, a network/cell may provide the UE with a timer value to determine whether the UE has been stationary for a time. If the UE detects that it is stationary, the UE may start the timer. The UE may stop the timer if the UE detects that it is not stationary. If the timer expires, the UE may remove and/or discard the provided/stored White List(s).

Condition 2: a specific service (e.g., triggered by the NAS of the UE) is needed.

Condition 3: a configured timer expires.

In one example, the UE may consider the current frequency (e.g., NR-U frequency) to be the lowest priority frequency for reselection for 300 seconds, after at least one of the conditions: (1) if a timer (e.g., "T_white") expires, and (2) if the candidate cell(s) the UE finds based on the White List(s) during the cell (re)selection procedure on that frequency are found not suitable due to belonging to a PLMN which is not indicated as equivalent to the registered (or allowed) PLMN(s).

In some implementations, when the UE cannot find candidate cell(s) based on the White List(s) during the cell (re)selection procedure(s), the UE may stop performing the cell (re)selection based on the White List(s) for a period of time (e.g., "T"). For example, T may be preconfigured or specified. T may be 300 s. For example, the UE may receive the T value associated with the White List(s) when the UE receives the White List(s). The UE may receive the T value via system information or via dedicated signaling. After a period of time (T) (e.g., Upon the expiry of a timer with T value), the UE may perform cell (re)selection based on the (stored) White List(s) if the UE is not provided/received with other White List(s) within the period of time, if the UE is not provided with other cell (re)selection criteria within the period of time, or if the UE does not find (or camp on) a suitable (or acceptable) cell within the period of time.

In some implementations, if the UE cannot find candidate cell(s) based on the White List(s), the UE may still (re)select and camp on a cell not indicated in the White List(s). The UE may perform a SI request procedure to the camped-on/serving cell to request the (updated) White List(s).

In some implementations, the UE may receive an indicator (e.g., si-BroadcastStatus IE) broadcast by the camped-on/serving cell in SIB1, to determine whether the system information message carrying the (intra-frequency, inter-frequency, inter-RAT intra-frequency, or inter-RAT inter-frequency) White List(s) before the UE sends the SI request message(s) or preamble(s) to the camped-on/serving cell. If the UE determines that the system information message carrying the White List(s) is broadcast, the UE may receive the system information message. If the UE determines that the system information carrying the White List(s) is not broadcast, the UE may send the SI request message(s) (e.g., via MSG3 based SI request) or preamble(s) (e.g., via MSG1 based SI request) to the camped-on/serving cell.

In some implementations, the UE may not determine whether to send the SI request message(s) or preambles(s) to the camped-on/serving cell based on the indicator broadcast in SIB1. In other words, the UE may directly send the SI request message (e.g., via MSG3 based SI request) and/or preamble(s) (e.g., via MSG1 based SI request) to the camped-on/serving cell to request the system information message carrying the (intra-frequency, inter-frequency, inter-RAT intra-frequency, or inter-RAT inter-frequency) White List(s).

In some implementations, the SI request (e.g., RRC System Information Request message), the UE sends to the camped-on/serving cell, may include the version number of the White List(s) or the version number of the system information message carrying the White List(s). The version number of the White List(s) or the version number of the system information message carrying the White List(s) may correspond to an indicator (e.g., value tag), indicating that the UE may not find a candidate cell based on the White List(s) and/or system information message carrying the White List(s) with the indicated version number. In response to the SI request and/or preamble(s), the camped-on/serving cell may respond to the UE with an updated White List.

In some implementations, once UE identifies that the system information area code broadcasted in the SIB1 by the cell is not different from the stored system information area code, the UE may initiate SI request procedures to acquire a new version of the White List.

Moreover, a fallback to other cell (re)selection procedures is provided. In some implementations, if the UE cannot find any candidate cell indicated by the White List(s) (e.g., intra-frequency White List(s) or inter-frequency White List(s)), or does not receive the White List(s), the UE may perform cell (re)selection according to a preconfigured priority among an intra-frequency, an inter-frequency and an inter-RAT.

In some implementations, if the UE cannot find any candidate cell indicated by the intra-frequency White List(s), the UE may request the inter-frequency White List(s). After the UE receives the inter-frequency White List(s), the UE may perform the cell (re)selection based on the inter-frequency White List(s).

In some implementations, if the UE cannot find any candidate cell indicated by the intra-frequency White List(s), the UE may perform inter-frequency cell (re)selection regardless of whether the UE is provided with inter-frequency White List(s).

In some implementations, if the UE cannot find any candidate cell indicated by the intra-frequency White List(s), if the UE cannot find any candidate cell indicated by the inter-frequency White List(s), if the UE cannot find any cell during intra-frequency cell (re)selection, or if the UE cannot find any cell during inter-frequency cell (re)selection, the UE may perform an inter-RAT cell (re)selection procedure, where the UE may have been provided with inter-RAT (e.g., inter-frequency or intra-frequency) White List(s).

In some implementations, if the UE cannot find any candidate cell indicated by the intra-frequency White List(s), if the UE cannot find any candidate cell indicated by the inter-frequency White List(s), if the UE cannot find any cell during intra-frequency cell (re)selection, or if the UE cannot find any cell during inter-frequency cell (re)selection, the UE may request the inter-RAT (intra-frequency or inter-frequency) White List(s). After the UE receives the inter-RAT (inter-frequency or intra-frequency) White List(s), the UE may perform cell (re)selection based on the inter-RAT (inter-frequency or intra-frequency) White List(s).

In some implementations, if the UE cannot find any candidate cell indicated by the intra-frequency White List(s), if the UE cannot find any candidate cell indicated by the inter-frequency White List(s), if the UE cannot find any cell during intra-frequency cell (re)selection, or if the UE cannot find any cell during inter-frequency cell (re)selection, the UE may perform inter-RAT (inter-frequency or intra-frequency) cell (re)selection regardless of whether the UE is provided with inter-RAT (inter-frequency or intra-frequency) White List(s).

In some implementations, if the UE cannot find any candidate cell indicated by the intra-frequency White List(s), if the UE cannot find any candidate cell indicated by the inter-frequency White List(s), if the UE cannot find any cell during intra-frequency cell (re)selection, or if the UE cannot find any cell during inter-frequency cell (re)selection, the UE may lower the priority of the frequency on which the UE cannot find any candidate cell. The UE may lower the priority of the frequency for a period of time (e.g., "T1"). The value of T1 may be preconfigured or specified. The value of T1 may be provided to the UE via system information or dedicated signaling. The value of T1 may be provided to the UE with the White List. In some implementations, the UE may lower the priority of the frequency to the lowest priority for a period of time (T1). The UE may lower the priority of the frequency to a configured (or defined) value. The configured value may be provided to the UE via dedicated signaling or system information. The configured value may both be provided to the UE in the same information, which carries the White List(s). The configured value may be provided to the UE with the White List(s). After a period of time (T1), the UE may change the priority of the frequency back to the priority value before the UE lowered the priority of the frequency. After a period of time (T1), the UE may change the priority of the frequency to the priority value based on the configuration received from the cell.

In some implementations, if the UE cannot find any candidate cell indicated by the intra-frequency White List(s) on the unlicensed frequency, if the UE cannot find any candidate cell indicated by the inter-frequency White List(s) on the unlicensed frequency, if the UE cannot find any cell during intra-frequency cell (re)selection on the unlicensed frequency, or if the UE cannot find any cell during inter-frequency cell (re)selection on the unlicensed frequency, the UE may perform the cell (re)selection on the licensed frequency.

In some implementations, if the UE cannot find any candidate cell indicated by the intra-frequency White List(s), if the UE cannot find any candidate cell indicated by the inter-frequency White List(s), if the UE cannot find any cell during intra-frequency cell (re)selection, or if the UE cannot find any cell during inter-frequency cell (re)selection, the UE may bar the cell(s) indicated in the intra-frequency White List(s), inter-frequency White List(s), or inter-RAT (e.g., intra-frequency or inter-frequency) White List(s). The UE may bar these cell(s) (or ignore, suspend or remove the (intra-frequency, inter-frequency, inter-RAT (intra-frequency or inter-frequency)) White List configuration) for a period of time (e.g., "T2"). The value of T2 may be preconfigured or specified. The value of T2 may be provided to the UE via system information or dedicated signaling. The value of T2 may be provided to the UE with the White List(s) indicating the barred cell(s). The value of T2 may be provided to the UE in the same information, which carries the White List(s). If the cell is barred, the UE may not (re)select the barred cell. If the UE ignores, suspends or removes the (intra-frequency, inter-frequency, inter-RAT (intra-frequency or inter-frequency)) White List configuration, the UE may not perform cell (re)selection based on the White List configuration. After the period of time (T2), the UE may not bar the cell(s). After the period of time (T2), the UE may (store and) apply the (intra-frequency, inter-frequency, inter-RAT (intra-frequency or inter-frequency)) White List configuration for cell (re)selection. Thus, the UE may (re)select the cell(s).

In some implementations, if the UE cannot find any candidate cell indicated by the intra-frequency White List(s), if the UE cannot find any candidate cell indicated by the inter-frequency White List(s), if the UE cannot find any cell during intra-frequency cell (re)selection, or if the UE cannot find any cell during inter-frequency cell (re)selection, the UE may perform cell (re)selection based on the top-N strongest cell(s) on the corresponding (intra-, inter-, licensed, or unlicensed) frequency. The UE may measure the reference signal (e.g., SSB, CSI-RS, TRS) of cell(s) on the corresponding (intra-, inter-, licensed, or unlicensed) frequency. The UE may further read the SIB1 of the top-N strongest cell(s), to determine whether the PLMN operating the top-N strongest cell(s) belongs to the UE's allowed PLMN(s). If the UE (only) finds top-M strongest cell(s), where M is less than N, the UE may further read the SIM of the top-M strongest cell(s), to determine whether the PLMN operating the top-M strongest cell(s) belongs to the UE's allowed PLMN(s). The UE may (re)select a cell whose PLMN belongs to the UE's allowed PLMN(s), where the (re)selected cell is one of the top-N (or top-M) strongest cell(s). The UE may (re)select a cell whose PLMN belongs to the UE's allowed PLMN(s), where the (re)selected cell has the strongest signal strength (e.g., Reference Signal Received Power (RSRP), Reference Signal Received Quality (RSRQ)) among the top-N (or top-M) strongest cell(s) whose PLMN belongs to the UE's allowed PLMN(s). The value of 'N' may be preconfigured or specified. The UE may receive the value of 'N' via system information or dedicated signaling. The UE may receive the value of 'N' with the White List(s). The UE may receive the value of 'N' in the same information in which the UE receives the White List(s).

In some implementations, if the RRC_INACTIVE UE cannot find any candidate cell indicated by the intra-frequency White List(s), if the RRC_INACTIVE UE cannot find any candidate cell indicated by the inter-frequency White List(s), if the RRC_INACTIVE UE cannot find any cell during intra-frequency cell (re)selection, or if the RRC_INACTIVE UE cannot find any cell during inter-frequency cell (re)selection, the RRC_INACTIVE UE may enter 'Any Cell Selection sub-state' of the RRC_INACTIVE state.

In some implementations, if the RRC_IDLE UE cannot find any candidate cell indicated by the intra-frequency White List(s), if the RRC_IDLE UE cannot find any candidate cell indicated by the inter-frequency White List(s), if the RRC_IDLE UE cannot find any cell during intra-frequency cell (re)selection, or if the RRC_IDLE UE cannot find any cell during inter-frequency cell (re)selection, the RRC_IDLE UE may enter 'Any Cell Selection sub-state' of the RRC_IDLE state. In "Any Cell Selection sub-state", the UE may perform the cell (re)selection procedure without considering the White List(s).

In "Any Cell Selection sub-state", the UE may perform the cell (re)selection procedure without considering the White List(s). In some implementations, in "Any Cell Selection sub-state", the UE may perform the cell (re)selection procedure based on the White List(s).

In some implementations, an "Inactive-state-specific" White List may be provided, where the "Inactive-state-specific" White List may be different from an "Idle-state-specific" White List. The UE may receive the "Inactive-state-specific" White List via an RRC message (e.g., RRC Reconfiguration message with suspend configuration, in the suspend configuration of an RRC Reconfiguration message) or via system information from the serving cell. The UE may receive the "Idle-state-specific" White List via an RRC message (e.g., RRC Release message) or via system information. An RRC_INACTIVE UE may (store and) apply the "Inactive-state-specific" White List to perform cell (re)selection and an RRC_IDLE UE may (store and) apply the "Idle-state-specific" White List to perform cell (re)selection. If the RRC_INACTIVE UE transitions to RRC_IDLE, the UE may remove and/or ignore the "Inactive-state-specific" White List. When the RRC_INACTIVE UE transitions to RRC_IDLE, the UE may be provided with the "Idle-state-specific" White List either via dedicated signaling or via system information. An RRC_INACTIVE UE may receive (and store) the "Idle-state-specific" White List via system information. An RRC_INACTIVE UE may perform cell (re)selection based on the "Inactive-state-specific" White List if the "Inactive-state-specific" White List is provided. If the "Inactive-state-specific" White List is not provided, the RRC_INACTIVE UE may perform cell (re)selection based on the "Idle-state-specific" White List.

It is noted that the White List that the UE receives via dedicated signaling may be referred to as "UE-specific" White List(s). The White List(s) that the UE receives via system information may be referred to as "cell-specific" White List(s). The White List(s) provided to the RRC_INACTIVE UE may be referred to as "Inactive-state-specific" White List(s). The "Inactive-state-specific" White List(s) may be a type of "UE-specific" White List(s), or a type of "cell-specific" White List(s). The White List(s) provided to the RRC_IDLE UE may be referred to as "Idle-state-specific" White List(s). The "Idle-state-specific" White List(s) may be a type of "UE-specific" White List(s), or a type of "cell-specific" White List(s).

In some implementations, if the UE cannot find any candidate cell indicated by the intra-frequency White List(s), if the UE cannot find any candidate cell indicated by the inter-frequency White List(s), if the UE cannot find any cell during intra-frequency cell (re)selection, or if the UE cannot find any cell during inter-frequency cell (re)selection, the UE may report the White List(s) and/or the ID of the cell providing the White List(s), to a camped-on/serving cell via dedicated signaling, when the UE camps on or connects to a serving cell. The camped-on/serving cell may be the same as the cell providing the White List(s) to the UE. If the camped-on/serving cell is the same as the cell providing the White List(s) to the UE, the UE may report the White List(s) to the camped-on/serving cell. If the camped-on/serving cell is the same as the cell providing the White List(s) to the UE, the UE may report an indicator corresponding to the White List(s) to the camped-on/serving cell. If the camped-on/serving cell is different from the cell providing the White List(s) to the UE, the UE may report both the White List(s) and the ID of the cell providing the White List(s), to the camped-on/serving cell.

Furthermore, an indicator to indicate to the UE whether to use the White List(s) is disclosed.

In some implementations, the UE may be provided with an indicator to indicate whether the UE may (store and) apply the White List(s) for cell (re)selection. If the indicator is set to "true", the UE may (only) consider the cells satisfying the White List(s) as candidate cells for cell (re)selection. If the indicator is set to "true", the UE may consider (only) the cells included the White List(s) are applicable for cell (re)selection. If the indicator is set to "false", the UE may perform cell (re)selection without considering the White List(s). If the cell does not provide the indicator, the UE may perform cell (re)selection considering the White List(s). That is, the White List(s) may be valid by default if the cell does not provide the indicator.

The UE may receive the indicator via system information or via dedicated signaling, from the cell providing the White List(s). The White List(s) may include the indicator associated with the White List(s). The configuration including the White List(s) may include the indicator associated with the White List(s). The UE may receive the indicator with the White List(s).

White List for cell selection in an unlicensed frequency (or in a licensed frequency) is disclosed.

In some implementations, for an unlicensed frequency, cell selection may include initial cell selection (no prior knowledge of which RF channels are unlicensed frequencies (e.g., NR-U frequencies)), and cell re-selection by leveraging stored information.

For initial cell selection, the UE may scan all RF channels in the unlicensed frequency bands (e.g., NR-U bands) according to the UE's capabilities to find a suitable cell. On each frequency, the UE may not (only) search for the strongest cell. The UE may search for top-Ns strongest cell(s). The UE may measure the reference signal (e.g., SSB) of cell(s) on the corresponding frequencies. The UE may further read the SIB1 of the top-Ns strongest cell(s), to determine whether the cell is a suitable cell. If the UE only finds top-Ms strongest cell(s), where Ms is less than Ns, the UE may further read the SIB1 of the top-Ms strongest cell(s), to determine whether the cell is a suitable cell. The UE may select a cell which is a suitable cell, where the selected cell is one of the top-Ns (or top-Ms) strongest cell(s). The UE may select a cell which is a suitable cell, where the selected cell has the strongest signal strength (e.g., RSRP, RSRQ) among the top-Ns (or top-Ms) strongest cell(s) which are suitable cell(s). The value of Ns may be preconfigured or specified. The value of Ns may be infinite. The UE may receive the value of Ns via system information or dedicated signaling. The UE may receive the value of Ns with the White List. The UE may receive the value of Ns in the same information in which the UE receives the White List. In some implementations, if the UE finds a PLMN broadcast by a cell in SIB1 that does not belong to the UE's allowed PLMN, and if the cell also broadcasts the White List associated with the PLMN, the UE may skip reading the SIB1 of cell(s) indicated by the White List broadcast by a cell whose PLMN does not belong to the UE's allowed PLMN.

The cell (re)selection by leveraging stored information may require stored information of (unlicensed) frequencies and optionally also information on cell parameters from previously received measurement control information elements or from previously detected cells. The stored information may include (but not limited to) the White List(s). Once the UE has found a suitable cell, the UE may select it. In some implementations, during cell (re)selection by leveraging stored information, if the UE finds a PLMN broadcast by a cell in SIB1 that does not belong to the UE's allowed PLMN, and if the cell also broadcasts the White List associated with the PLMN, the UE may skip reading the SIB1 of cell(s) indicated by the White List(s) broadcast by a cell whose PLMN does not belong to the UE's allowed PLMN. If no suitable cell is found, the UE may perform the initial cell selection procedure.

The terms "NW", "network" "cell," "base station," "gNB," "eNB," and "ng-eNB" may be utilized interchangeably in the present disclosure.

System information may refer to MIB, SIB1, or other SI. Minimum SI may include MIB and SIB1. Other SI may refer to SIB3, SIB4, SIB5, and other SIB(s). The UE may receive the system information via broadcast from a cell. The cell may periodically broadcast the system information. The cell may broadcast the system information due to the SI request from a UE. The UE may receive the system information in an RRC message via dedicated signaling from a cell. The cell may transmit the system information in the RRC message due to the SI request from a UE.

Dedicated signaling may refer to (but not limited to) RRC message(s). For example, RRC (Connection) Setup Request message, RRC (Connection) Setup message, RRC (Connection) Setup Complete message, RRC (Connection) Reconfiguration message, RRC (Connection) Reconfiguration complete message, RRC (Connection) Resume Request message, RRC (Connection) Resume message, RRC (Connection) Resume Complete message, RRC (Connection) Reestablishment Request message, RRC (Connection) Reestablishment message, RRC (Connection) Reestablishment Complete message, RRC (Connection) Reject message, RRC (Connection) Release message, RRC System Information Request message, UE Assistance Information message, UE Capability Enquiry message, and UE Capability Information message.

An allowed PLMN for a UE may be (but not limited to) a R-PLMN, a selected PLMN, or E-PLMN(s) of a UE.

The UE may measure the signal strength of a cell in terms of RSRP, RSRQ, and Received Signal Strength Indicator (RSSI). If a cell is with good signal quality, the UE may determine that the measured signal strength of a cell is above (or equal to) a threshold. For example, the measured RSRP of a cell is above (or equal to) a RSRP threshold. For example, the measured RSRQ of a cell is above (or equal to) a RSRQ threshold. For example, the measured RSSI of a cell is above (or equal to) a RSSI threshold. If a cell fulfills S criteria, the measured signal strength of the cell is above (or equal to) a threshold in terms of RSRP and/or RSRQ.

The RRC_IDLE/RRC_INACTIVE UE may camp on a cell. The RRC_CONNECTED UE may be served by a (serving) cell. The proposed design(s) may be applicable for RRC_IDLE/RRC_INACTIVE/RRC_CONNECTED UE(s).

The White List(s) may be intra-frequency White List, inter-frequency White List, inter-RAT intra-frequency White List, and inter-RAT inter-frequency White List.

The inter-RAT cell (re)selection may be inter-RAT intra-frequency cell (re)selection and inter-RAT inter-frequency cell (re)selection.

The RAT may be (but not limited to) NR, LTE, E-UTRA connected to 5GC, LTE connected to 5GC, E-UTRA connected to EPC, and LTE connected to EPC.

A suitable cell is a cell on which a UE may camp. The UE may consider a cell as suitable if the following conditions are fulfilled: (1) The cell is part of either the selected PLMN or the registered PLMN or PLMN of the E-PLMN list, and (2) The cell selection criteria (e.g., S criteria) of the cell are fulfilled. Furthermore, according to the latest information provided via the NAS of the UE, the suitable cell is not barred. The suitable cell is part of at least one TA that is not part of the list of "Forbidden Tracking Areas," which belongs to a PLMN that fulfills the condition (1).

The proposed mechanism may be used for a licensed frequency and/or unlicensed frequency.

The UE may be served by a cell (e.g., serving cell). The serving cell may serve (but not limited to) an RRC_CONNECTED UE. The serving cell may be (but not limited to) a suitable cell.

The UE may camp on a cell (e.g., camped-on cell). The camped-on cell may be a suitable cell or an acceptable cell.

An acceptable cell is a cell on which the UE may camp to obtain limited service (e.g., originate emergency calls and receive Earthquake and Tsunami Warning System (ETWS) and Commercial Mobile Alert System (CMAS) notifications). Such a cell may fulfill the following requirements, which is the minimum set of requirements to initiate an emergency call and to receive ETWS and CMAS notification in an NR network: (1) the cell is not barred, and/or (2) the cell selection criteria are fulfilled.

The cells (e.g., indicated by PLMN information, area information, and/or frequency information) included in the White List(s) may be the neighboring cells for the UE which receives the White List(s).

The White List(s) that the UE receives via dedicated signaling may refer to the "UE-specific" White List(s). The White List(s) that the UE receives via system information may refer to the "cell-specific" White List(s). The White List(s) provided to an RRC_INACTIVE UE may refer to Inactive-state-specific White List(s). The Inactive-state-specific White List(s) may be a type of "UE-specific" White List(s), or a type of "cell-specific" White List(s). The White List(s) provided to an RRC_IDLE UE may refer to Idle-state-specific White List(s). The Idle-state-specific White List(s) may be a type of "UE-specific" White List(s), or a type of "cell-specific" White List(s).

Figure 2:
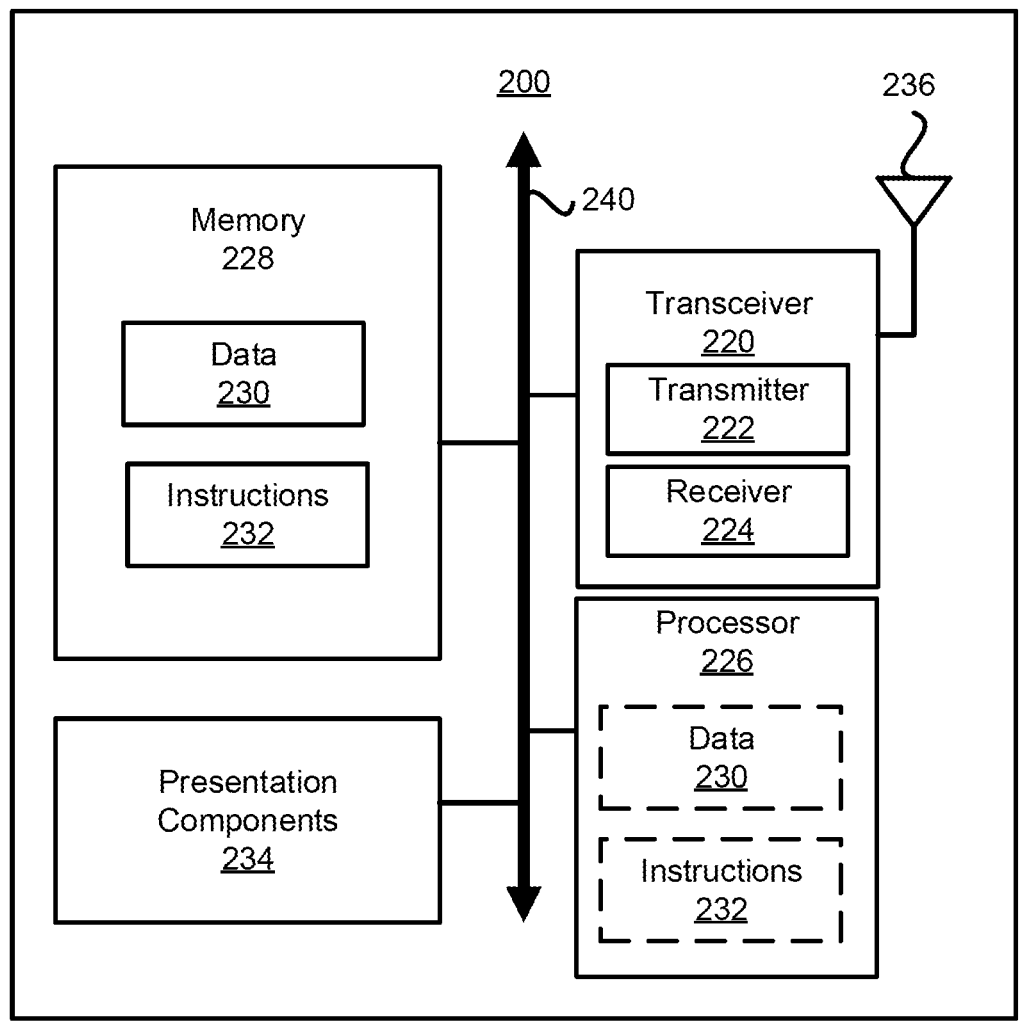
FIG. 2 is a block diagram illustrating a node for wireless communication, according to an implementation.

FIG. 2 is a block diagram illustrating a node 200 for wireless communication according to an implementation of the present disclosure.

As illustrated in FIG. 2, the node 200 may include a transceiver 220, a processor 226, a memory 228, one or more presentation components 234, and at least one antenna 236. The node 200 may also include a Radio Frequency (RF) spectrum band module, a BS communications module, a network communications module, and a system communications management module, input/output (I/O) ports, I/O components, and a power supply (not illustrated in FIG. 2). Each of these components may be in communication with each other, directly or indirectly, over one or more buses 240. The node 200 may be a UE or a BS that performs various disclosed functions as illustrated in FIG. 1.

The transceiver 220 may include a transmitter 222 (with transmitting circuitry) and a receiver 224 (with receiving circuitry) and may be configured to transmit and/or receive time and/or frequency resource partitioning information. The transceiver 220 may be configured to transmit in different types of subframes and slots including, but not limited to, usable, non-usable and flexibly usable subframes and slot formats. The transceiver 220 may be configured to receive data and control channels.

The node 200 may include a variety of computer-readable media. Computer-readable media may be any media that can be accessed by the node 200 and include both volatile (and non-volatile) media, removable (and non-removable) media. Computer-readable media may include computer storage media and communication media. Computer storage media may include both volatile (and/or non-volatile), as well as removable (and/or non-removable) media implemented according to any method or technology for storage of information such as computer-readable media.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal. Communication media may typically embody computer-readable instructions, data structures, program modules or other data in a modulated data signal such as a carrier wave or other transport mechanisms and include any information delivery media. The term "modulated data signal" may mean a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the disclosed media should be included within the scope of computer-readable media.

The memory 228 may include computer-storage media in the form of volatile and/or non-volatile memory. The memory 228 may be removable, non-removable, or a combination thereof. For example, the memory 228 may include solid-state memory, hard drives, optical-disc drives, etc. As illustrated in FIG. 2, the memory 228 may store computer-readable and/or computer-executable instructions 232 (e.g., software codes) that are configured to, when executed, cause the processor 226 (e.g., processing circuitry) to perform various disclosed functions. Alternatively, the instructions 232 may not be directly executable by the processor 226 but may be configured to cause the node 200 (e.g., when compiled and executed) to perform various disclosed functions.

The processor 226 may include an intelligent hardware device, a central processing unit (CPU), a microcontroller, an ASIC, etc. The processor 226 may include memory. The processor 226 may process the data 230 and the instructions 232 received from the memory 228, and information through the transceiver 220, the baseband communications module, and/or the network communications module. The processor 226 may also process information to be sent to the transceiver 220 for transmission via the antenna 236, to the network communications module for transmission to a CN.

One or more presentation components 234 may present data to a person or other devices. Presentation components 234 may include a display device, a speaker, a printing component, a vibrating component, etc.

From the present disclosure, it is evident that various techniques can be utilized for implementing the concepts of the present disclosure without departing from the scope of those concepts. Moreover, while the concepts have been disclosed with specific reference to specific implementations, a person of ordinary skill in the art would recognize that changes can be made in form and detail without departing from the scope of those concepts. As such, the present disclosure is to be considered in all respects as illustrative and not restrictive. It should also be understood that the present disclosure is not limited to the particular described implementations, but that many rearrangements, modifications, and substitutions are possible without departing from the scope of the present disclosure.

What is claimed is:

1. A method of performing one of cell selection and reselection by a user equipment (UE):
    receiving, by the UE, a white list during one of a radio resource control (RRC) idle mode and an RRC inactive mode, the white list received from a serving cell having a serving cell identity, wherein the white list includes at least one cell identity, each of the at least one cell identity identifying a neighboring cell on at least one of an intra-frequency and an inter-frequency corresponding to a frequency that the serving cell is on, wherein each of the at least one cell identity is different from the serving cell identity;
    decoding a cell identity from a synchronization signal received from a cell;
    determining whether the cell is on the white list based on the decoded cell identity;
    in response to the UE determining that the cell is on the white list, performing a measurement on the cell; and
    one of selecting and reselecting the cell according to the measurement.

2. The method of claim 1, wherein each of the at least one cell identity is indicated by a physical cell identity (PCI) and the white list includes a maximum of 16 PCIs.

3. The method of claim 2, wherein the at least one cell identity is identified by a number of the PCIs and a start value of a PCI range associated with the number of the PCIs.

4. The method of claim 1, wherein the white list is received via one of a system information block (SIB)3 and a SIB4.

5. The method of claim 1, wherein the white list further includes at least one of Public Land Mobile Network (PLMN) information, area information and frequency information.

6. The method of claim 1, further comprising:
receiving, from the serving cell, at least one of Public Land Mobile Network (PLMN) information, area information and frequency information associated with the white list.

7. A user equipment (UE) for performing one of cell selection and reselection, the UE comprising:
a processor, for executing computer-executable instructions; and
a non-transitory computer-readable medium, coupled to the processor, for storing the computer-executable instructions, wherein the computer-executable instructions instruct the processor to:
receive a white list during one of a radio resource control (RRC) idle mode and an RRC inactive mode, the white list received from a serving cell having a serving cell identity, wherein the white list includes at least one cell identity, each of the at least one cell identity identifying a cell on at least one of an intra-frequency and an inter-frequency corresponding to a frequency that the serving cell is on, wherein each of the at least one cell identity is different from the serving cell identity;
decode a cell identity from a synchronization signal received from a cell;
determine whether the cell is on the white list based on the decoded cell identity;
in response to the UE determining that the cell is on the white list, perform a measurement on the cell; and
one of select and reselect the cell according to the measurement.

8. The UE of claim 7, wherein each of the at least one cell identity is indicated by a physical cell identity (PCI) and the white list includes a maximum of 16 PCIs.

9. The UE of claim 8, wherein the at least one cell identity is identified by a number of the PCIs and a start value of a PCI range associated with the number of the PCIs.

10. The UE of claim 7, wherein the white list is received via one of a system information block (SIB)3 and a SIB4.

11. The UE of claim 7, wherein the white list further comprises at least one of Public Land Mobile Network (PLMN) information, area information and frequency information.

12. The UE of claim 7, wherein the computer-executable instructions further instruct the processor to:
receive, from the serving cell, at least one of Public Land Mobile Network (PLMN) information, area information and frequency information associated with the white list.

* * * * *